(12) United States Patent
Chang et al.

(10) Patent No.: US 9,077,412 B2
(45) Date of Patent: Jul. 7, 2015

(54) REGENERATIVE RECEIVER ARCHITECTURES FOR MILLIMETER-WAVE AND SUB-MILLIMETER-WAVE IMAGING AND COMMUNICATION

(71) Applicant: THE REGENTS OF THE UNIVERSITY OF CALIFORNIA, Oakland, CA (US)

(72) Inventors: Mau-Chung Frank Chang, Los Angeles, CA (US); Adrian Tang, Pasadena, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 223 days.

(21) Appl. No.: 13/768,695

(22) Filed: Feb. 15, 2013

(65) Prior Publication Data

US 2014/0027638 A1    Jan. 30, 2014

Related U.S. Application Data

(63) Continuation-in-part of application No. PCT/US2011/051125, filed on Sep. 9, 2011.

(60) Provisional application No. 61/598,996, filed on Feb. 15, 2012, provisional application No. 61/381,901, filed on Sep. 10, 2010.

(51) Int. Cl.
*H04B 1/06* (2006.01)
*G01S 7/285* (2006.01)
(Continued)

(52) U.S. Cl.
CPC . *H04B 1/06* (2013.01); *G01S 7/285* (2013.01); *G01S 13/89* (2013.01); *H04B 1/24* (2013.01)

(58) Field of Classification Search
CPC ............ G01S 7/285; G01S 13/89; H04B 1/06
USPC ....................................... 250/336.1
See application file for complete search history.

(56) References Cited

U.S. PATENT DOCUMENTS 7,215,936 B2   5/2007 Sadowski
7,263,138 B2 * 8/2007 Lourens ........................ 375/316
(Continued)

OTHER PUBLICATIONS

Jia-Yi Chen, Michael P. Flynn and John P. Hayes, "A Fully Integrated Auto-Calibrated Super-Regenerative Receiver in 0.13um CMOS", IEEE JSSC, vol. 42, No. 9, Sep. 2007, pp. 1976-1985.
(Continued)

*Primary Examiner* — David Porta
*Assistant Examiner* — Mindy Vu
(74) *Attorney, Agent, or Firm* — John P. O'Banion

(57) ABSTRACT

A millimeter and sub-millimeter wavelength receiver imaging apparatus and method which directly generates a time encoded digital signal for an imaging pixel in response to interoperation of a digital quench circuit, an envelope detector, and a regenerative oscillator coupled to an antenna. The device utilizes the fact that oscillator startup time in a regenerative oscillator is inversely proportional to injected pixel image power. A digital quench circuit, such as a latch, is coupled for activating and deactivating the regenerative oscillator in response to receiving an output from an envelope threshold circuit, and for generating a time encoded digital signal in response to pixel amplitude during millimeter and sub-millimeter wavelength imaging. Receiver embodiments are described for both fundamental frequency operation (DRR) and for multi-frequency imaging (IRR).

25 Claims, 17 Drawing Sheets

(51) Int. Cl.
   *G01S 13/89* (2006.01)
   *H04B 1/24* (2006.01)

(56) References Cited

U.S. PATENT DOCUMENTS

| | | |
|---|---|---|
| 7,590,401 B1 | 9/2009 | Frazier |
| 8,330,600 B2 * | 12/2012 | Roeder et al. ............ 340/552 |
| 2004/0036165 A1 | 2/2004 | Ammar |
| 2006/0270381 A1 * | 11/2006 | Park et al. ............ 455/343.2 |
| 2007/0139130 A1 * | 6/2007 | Kim et al. ............ 331/185 |
| 2009/0156158 A1 | 6/2009 | Kang et al. |

OTHER PUBLICATIONS

Korean Intellectual Property Office, International Search Report and Written Opinion (pp. 1-9) issued on Apr. 10, 2012 for corresponding International Application No. PCT/US2011/051125 with claims searched (pp. 10-15) pp. 1-15.

* cited by examiner

REGENERATIVE RECEIVER ARCHITECTURES FOR MILLIMETER-WAVE AND SUB-MILLIMETER-WAVE IMAGING AND COMMUNICATION

CROSS-REFERENCE TO RELATED APPLICATIONS

This application is a 35 U.S.C. §111(a) continuation-in-part of PCT international application number PCT/US2011/051125 filed on Sep. 9, 2011, incorporated herein by reference in its entirety, which is a nonprovisional of U.S. provisional patent application Ser. No. 61/381,901 filed on Sep. 10, 2010, incorporated herein by reference in its entirety. This application is also a nonprovisional of U.S. provisional patent application Ser. No. 61/598,996 filed on Feb. 15, 2012, incorporated herein by reference its entirety.

The above-referenced PCT international application was published as PCT International Publication No. WO 2012/034103 on Mar. 15, 2012 and republished on May 31, 2012, and is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to millimeter and sub-millimeter wave imaging, and more particularly to a digital regenerative receiver (DRR) configured for outputting a digital signal in response to received pixel amplitude, a multi-band inter-modulated regenerative receiver (IRR), and an antenna-less super regenerative receiver (ASRR).

2. Description of Related Art

Millimeter wave scanners and imagers have applicability for various imaging purposes, such as for detecting concealed objects, loss prevention, screening, quality assurance and security. One primary advantage of these millimeter wave systems is that many common materials are translucent in extremely high frequency (EHF) (e.g., millimeter wave) radio frequency bands. This frequency range is just below the related sub-millimeter range of Terahertz radiation ("T-ray") range.

In previous receiver designs, Schottky barrier diodes, bolometers, Quantum Cascade Lasers (QCLs) and superconductor techniques have been utilized to construct signal receivers in the millimeter and sub-millimeter bands. Analog regenerative receivers have also been utilized in much lower frequency bands with analog quench circuitry along with analog output filtering.

In order for imagers based on Terahertz and millimeter-waves to become cost effective in a number of application areas, the core pixel circuits within the imaging array need to meet challenging constraints that originate from the system level design and the need for constructing large array structures on-chip. Perhaps one of the more critical constraints is that each pixel must operate at a very low power consumption. This is necessary because when integrated within an array, the total power consumption is multiplied by the number of elements in the array. For example in a square array, the power consumption inflates to $n^2$ for an array of n pixels in width and n pixels in height.

Another major constraint is the required circuit area covered by each pixel. This area constraint is important because a cost-effective pixel array should ideally fit on a wafer, or portion thereof, to facilitate monolithic fabrication and avoid complicated mechanical assembly of multiple array sections. Another constraint similar to that experienced in CMOS image sensor arrays is the challenge of routing large numbers of analog signals between each pixel in the array and a sampling analog-to-digital converter (ADC).

Implementation of high-resolution systems (i.e., above 100×100 pixels) in the millimeter-wave spectrum, provides a significant challenge toward simultaneously meeting each of these constraints. For example, traditional multiple-stage or heterodyne-based imaging receivers, require supplying a large number of bias currents which lead to increased power dissipation, while the need for a large number of passive devices require prohibitively large silicon area in the context of imaging array structures.

Accordingly, a need exists for high resolution imaging systems operating in the millimeter and sub-millimeter regimes which provide compact and power efficient operation.

BRIEF SUMMARY OF THE INVENTION

A digital regenerative receiver (DRR) for millimeter-wave and sub-millimeter-wave imaging and communication is described which is capable of receiving data or imaging signals in the millimeter and sub-millimeter wave range and converting directly into a digital signal by using a regenerative receiver that is quenched with a digital circuit. An inter-modulated regenerative receiver (IRR) is also described, which supports multiple frequency operations. Additionally, an antenna-less super regenerative receiver (ASSR) is described, which allows for a much smaller pixel size and area.

The radio frequency (RF) receiver for the millimeter and sub-millimeter wave band utilizes a regenerative oscillator to perform high gain amplification at high frequency and then quenches the oscillator with a digital circuit as opposed to an analog signal. This digital quench circuit in combination with the regenerative oscillator and envelope detector generate a time encoded digital output without the need for an analog-to-digital converter.

The present invention provides a number of beneficial elements which can be implemented either separately or in any desired combination without departing from the present teachings.

Further aspects and embodiments of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 19:
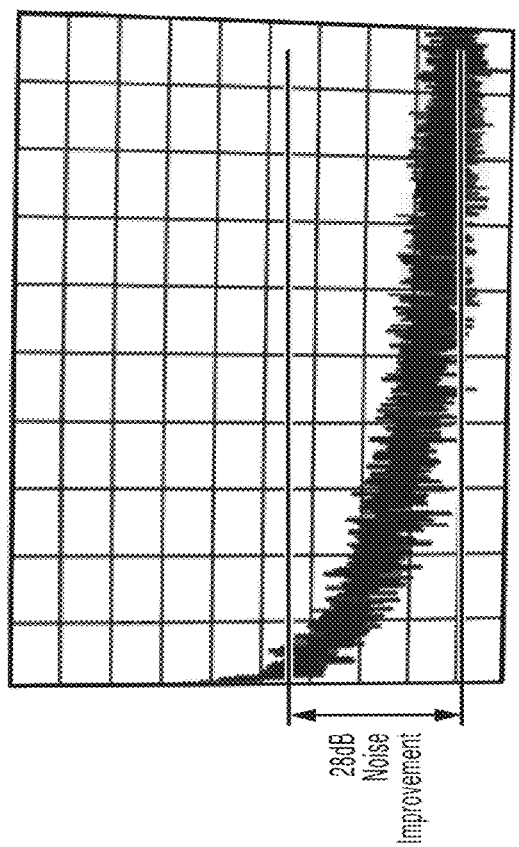
Figure 18:
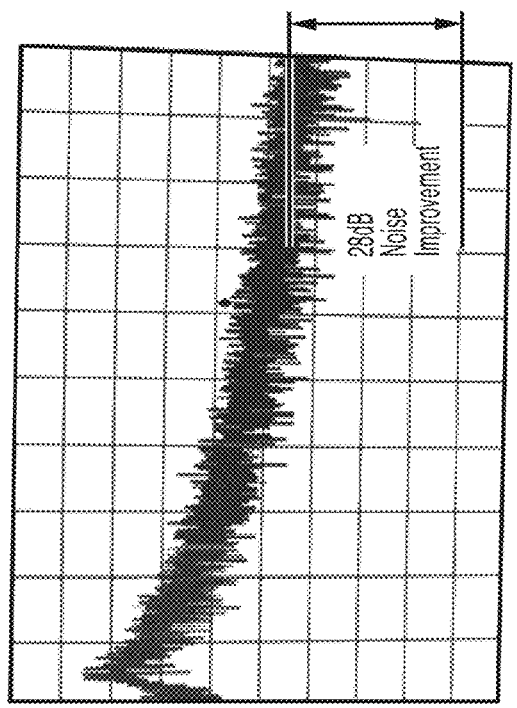

FIG. 18 and FIG. 19 compare received noise between a SRR with a conventional antenna (FIG. 18) and an antenna-less configuration according to an embodiment of the (FIG. 19).

Figure 20:
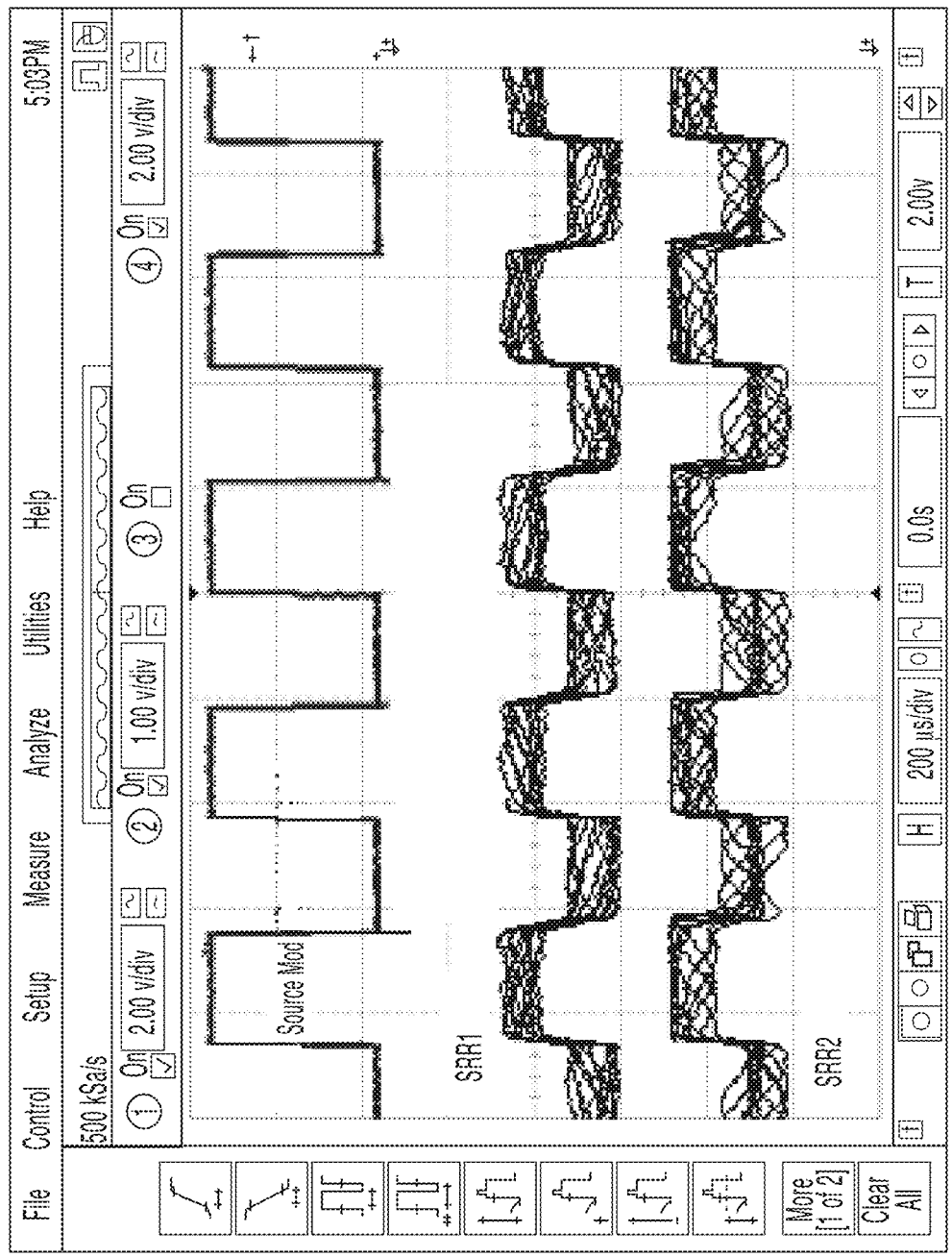
Figure 21:
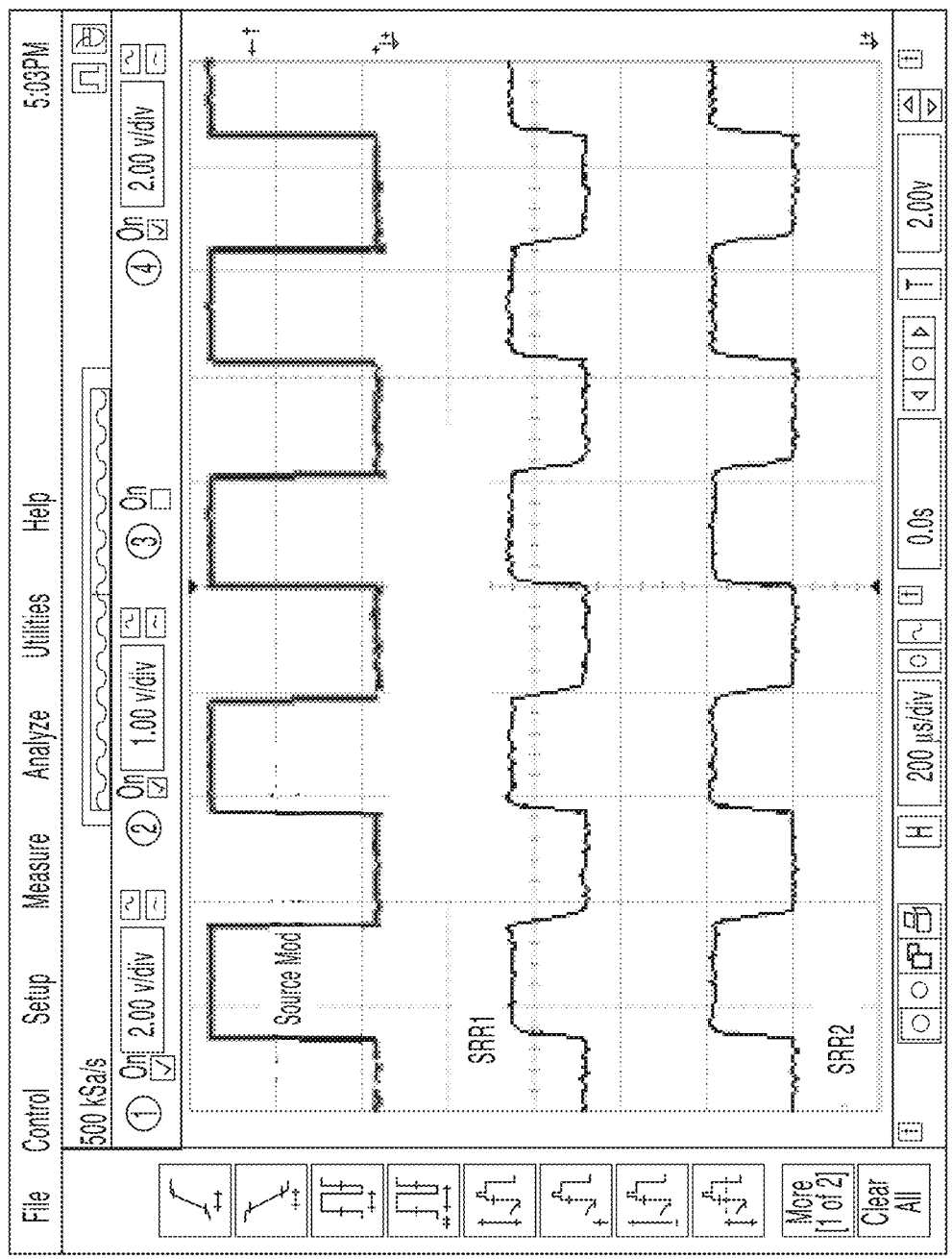

FIG. 20 and FIG. 21 are diagrams comparing time domain captures of the output of two SRRs in an array when quench signals are at different frequencies (Q1<>Q2) (FIG. 20) and synchronized with an H-tree (FIG. 21).

Figure 22:
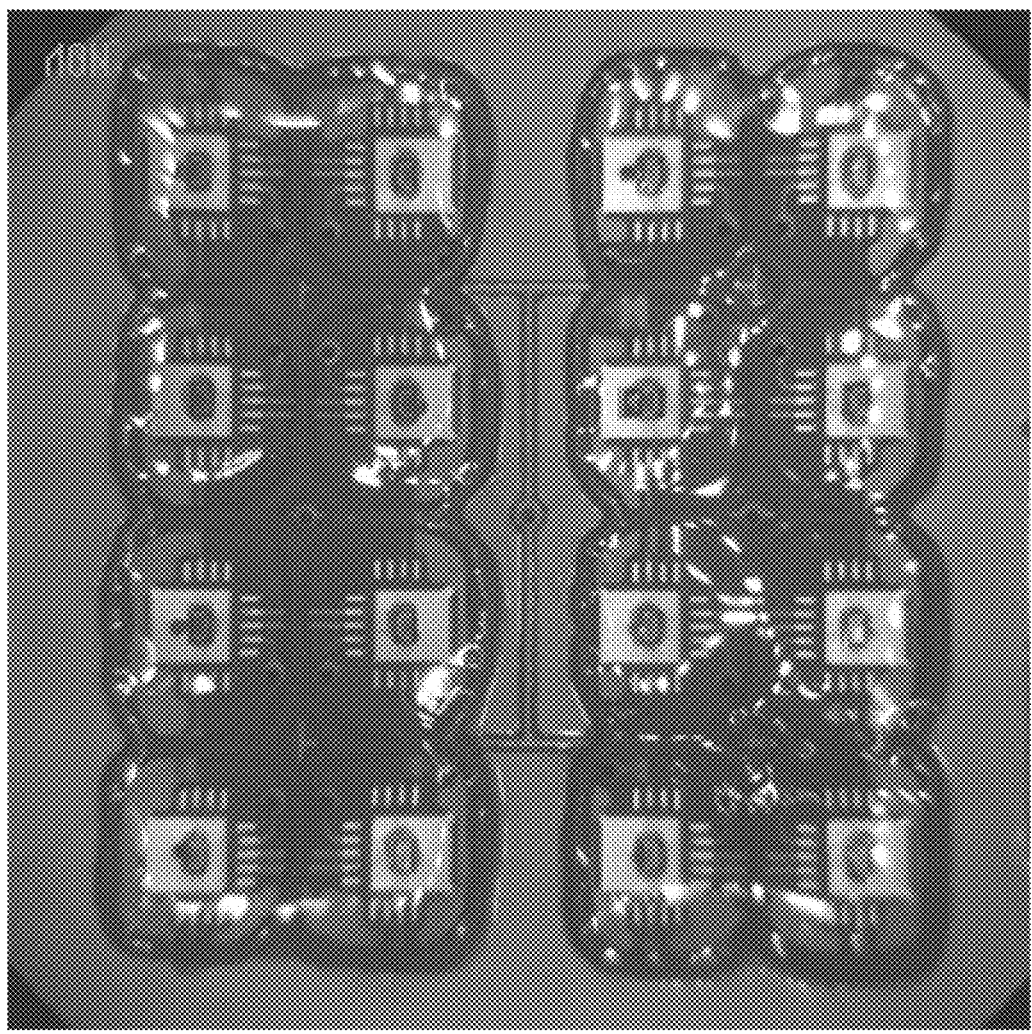

FIG. 22 is an image of a 4×4 focal plane array of 200 GHz IRRs implemented on a PCB board according to an embodiment of the invention, and shows and H-tree used to make sure the quench signal is correctly synchronized in both phase and frequency between each receiver in the array.

DETAILED DESCRIPTION OF THE INVENTION

The present invention, by way of example and not limitation, is a millimeter wave imaging system and method that is specifically adapted to meet requirements of imaging pixel arrays. Specifically, the inventive imaging receiver, which would be utilized as a pixel element within an imaging array, directly addresses three major constraints of existing millimeter wave imaging systems: (1) only two bias currents are required which reduce power dissipation; (2) only two passive inductors are required which minimize pixel area; and (3) a time-encoded output is generated which is more readily routed in response to by digital multiplexing which greatly simplifies pixel array interconnections while eliminating the need for AD conversion.

1. Digital Regenerative Receiver (DRR).

Toward overcoming the constraints of prior millimeter wave imaging systems, a novel digital regenerative receiver (DRR) for an imaging array has been created which significantly departs from the majority of extreme high frequency (EHF) radio systems. State of the art extreme high frequency communication systems rely heavily on heterodyne and direct conversion architectures, which provide an ability for coherent detection and recovery of phase information. The ability to recover phase information enables the use of quadrature signaling that is nearly ubiquitous in modern wireless links. The present invention does not retain phase information and relies on power only measurements in millimeter-wave imaging.

A historically important alternative to the popular heterodyne and direct conversion receiver architectures was the super-regenerative receiver, which could be utilized in non-coherent data receivers. In a regenerative oscillator system, oscillator startup time is inversely proportional to injected power. It will be noted that analog regeneration has been utilized in wireless receiver topologies in which the oscillator bias is modulated with an analog signal to start and stop the oscillation, while averaging the output envelope over many cycles to detect a received signal through changes in the DC (mean) voltage. The change in startup time is beneficially utilized in the regenerative oscillator of the present invention which interoperates with simple digital circuitry to directly output a digital signal representation of received image power at the fundamental frequency.

The regenerative receiver benefits from advantages offered by super-regenerative radio systems, while providing interoperative elements which solve a number of implementation issues. The DRR utilizes digital circuitry (e.g., CMOS) to control a regenerative receiver and generate a time-encoded output signal, which does not require analog to digital conversion. The novel architecture directly provides digital output, further reducing power consumption and the problems associated with transferring analog signals within a pixel array. The DRR operates with high receiver sensitivity, at millimeter and sub-millimeter frequencies while overcoming gain limitations through regeneration. Using the DRR approach, implementation is readily configurable across frequency bands, since the receiver contains a single oscillator and one gain stage allowing rapid adaptation to any frequency from the KHz to the THz range. Although it will be appreciated that long wavelength signals (e.g., kHz range) are not useful for the inventive imaging application, it could be utilized for other applications, such as in ultra-long-range data communications. The inventive circuit can be easily interleaved, such as toward achieving higher data rates. The DRR is clocked and can be implemented with a single tuned RF gain stage resulting in a small device area and low power overhead, making it ideal for interleaving multiple receivers together toward reaching higher baseband data (sample) rates. Interleaving can be implemented to achieve a higher sampling rate by combining IRR or DRR receivers together with multiple antennas and connecting them to the same clock.

It will be noted that one of the major advantage offered by CMOS imaging over semiconductor group III-V approaches is the possibility of constructing small and efficient two-dimensional (2D) imaging arrays. Currently, performance in semiconductor group III-V pixels remains dominant over reported CMOS imaging pixels at the cost of higher power and more area. To take full advantage of the opportunities that CMOS technology presents, the pixel circuits employed should offer low pixel area and require low operating power toward making array integration possible. Although particularly well-suited for implementation in CMOS, the present invention can be implemented in other technologies (e.g., Si CMOS, Si BiCMOS, HBT, HEMT or PHEMT) depending on the frequency, power level, and specific application conditions.

The present invention utilizes a digital regenerative receiver (DRR) architecture which is specifically adapted to meet requirements of millimeter-wave pixel array imaging while gaining benefit from super-regenerative principles. The inventive DRR uses digital CMOS circuitry to control a regenerative receiver and generate a time-encoded output signal.

FIG. 1A through FIG. 1D illustrate a simple embodiment 10 of an imaging receiver architecture, shown along with sample waveforms. The basic elements of the system are an antenna 12, an oscillator circuit 14, a latch circuit 18, and an envelope detector circuit 24. The antenna 12 is coupled to an input of oscillator 14. A clock signal 16 received at an input (e.g., set input) of the quench circuit 18 (e.g., a latch). Quench circuit 18 has an output 20 that is connected to oscillator circuit 14. Oscillator circuit 14 has an output 22 that is received at an input of the envelope detector (ENV DCT) circuit 24. Envelope detector circuit 24 has an output 26 that is coupled to another input of quench circuit 18 (e.g., reset input). When the edge of the digital clock signal 16 arrives, the quench circuit is set, which allows the oscillator to operate by removing the quenching of the oscillator. Once the oscillation envelope has reached (e.g., met and/or exceeded) a designed (any desired value) threshold, the envelope detector circuit 24 is excited and resets quench circuit 18, terminating the oscillation by the quench signal 20. The result is that quench signal 20 is a pulse-width (time-encoded) digital signal having pulse widths that are proportional to the received power.

Figure 1B:
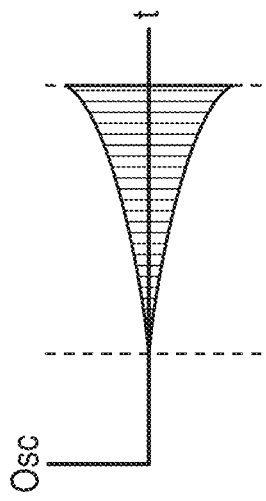
FIG. 1A through FIG. 1D are a block diagram of a digital regenerative receiver (DRR) device shown with key waveforms according to an embodiment of the present invention.
Figure 1C:
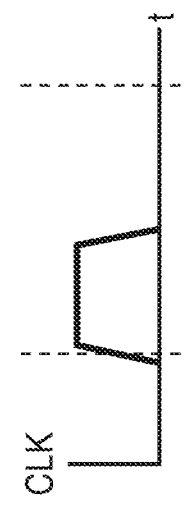
Figure 1D:
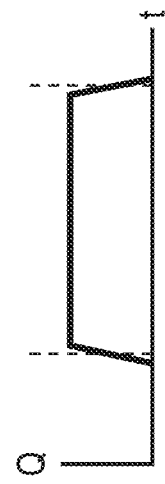
Figure 1A:
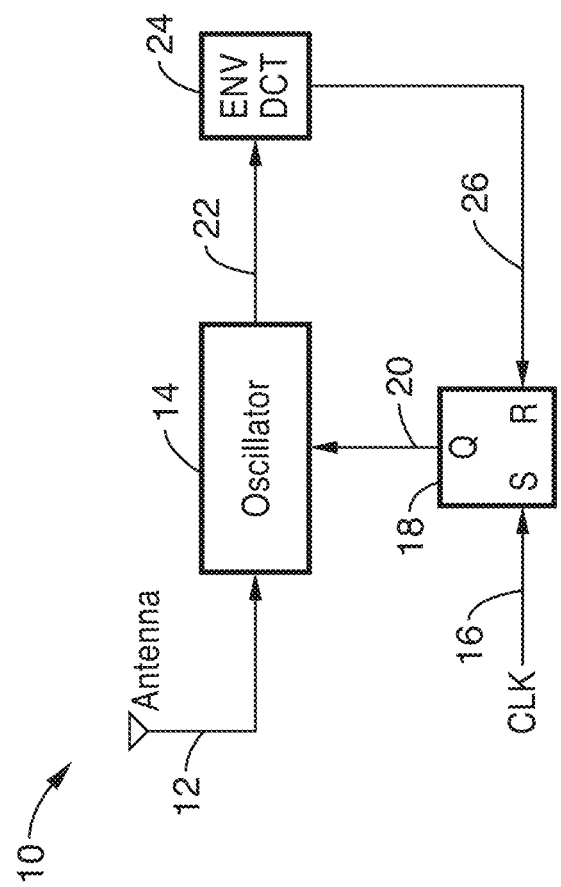

The super-regenerative principle of oscillator startup time being inversely proportional to injected power is utilized herein as the time between latch set and reset is also inversely proportional to the input power, and thus pixel image amplitude is converted to a time encoded digital signal. The waveform of the oscillator output 22 is shown in FIG. 1B, the waveform of the clock signal 16 input to quench circuit 18 is shown in FIG. 1C, and the waveform of the output (quench) signal 20 from quench circuit 18 shown in FIG. 1D as the time encoded digital output signal.

Figure 2:
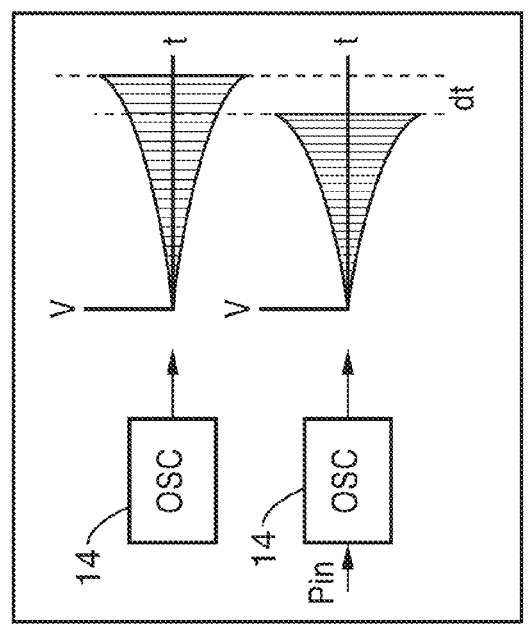
FIG. 2 is a graphical comparison of altered oscillator start up time envelopes in response to injected power according to an embodiment of the present invention.

FIG. 2 depicts how oscillator startup time changes in response to receipt of injected signal power at the fundamental frequency. A change in startup time (dt) is represented by voltage (V) envelopes in response to receiving a power input ($P_{in}$)) at the regenerative oscillator (OSC) circuit 14 shown with respect to time (t). In the upper portion of the figure, no additional signal power ($P_{in}$)) is received by oscillator circuit 14, such as from the antenna, wherein the oscillator starts slowly. In the lower portion of the figure, additional signal power ($P_{in}$)) at the resonant frequency is received, such as from the antenna, whereby the oscillator starts more readily. The difference in start time is utilized in the invention for detecting the amount of signal being received.

Figure 3:
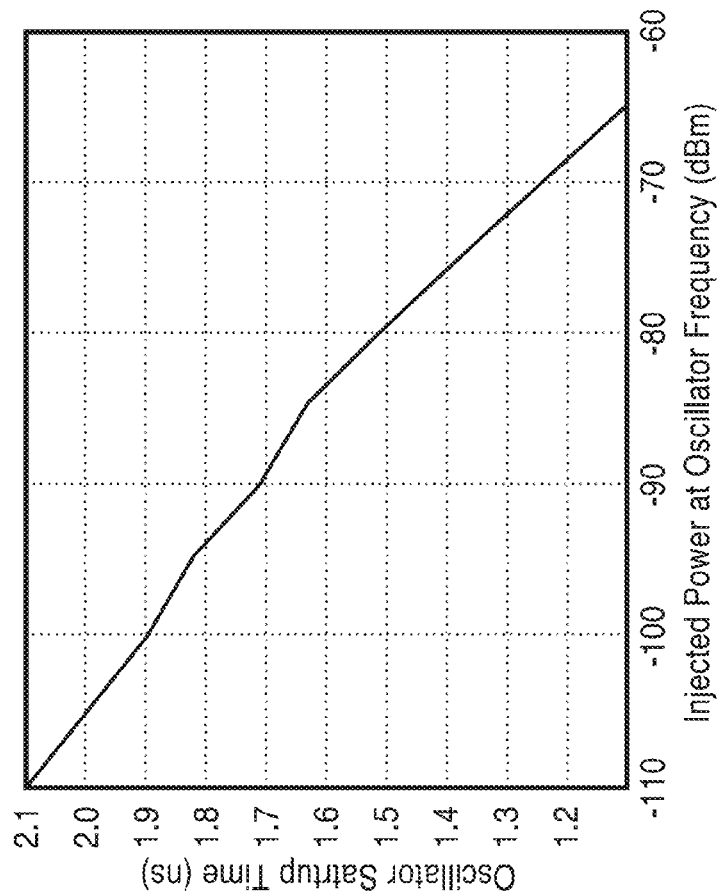
FIG. 3 is a graph of oscillator startup time with respect to injected pixel image power according to an embodiment of the present invention.

FIG. 3 depicts oscillator start up time in response to injected power at the oscillator frequency, with startup time shown changing from 1.1 nS to 2.1 nS over the injected power range as depicted. It can be seen from the figure that the change in startup time with respect to injected signal power at the oscillator frequency is substantially linear and thereby can be utilized as an accurate indicator of received signal power.

Figure 4:
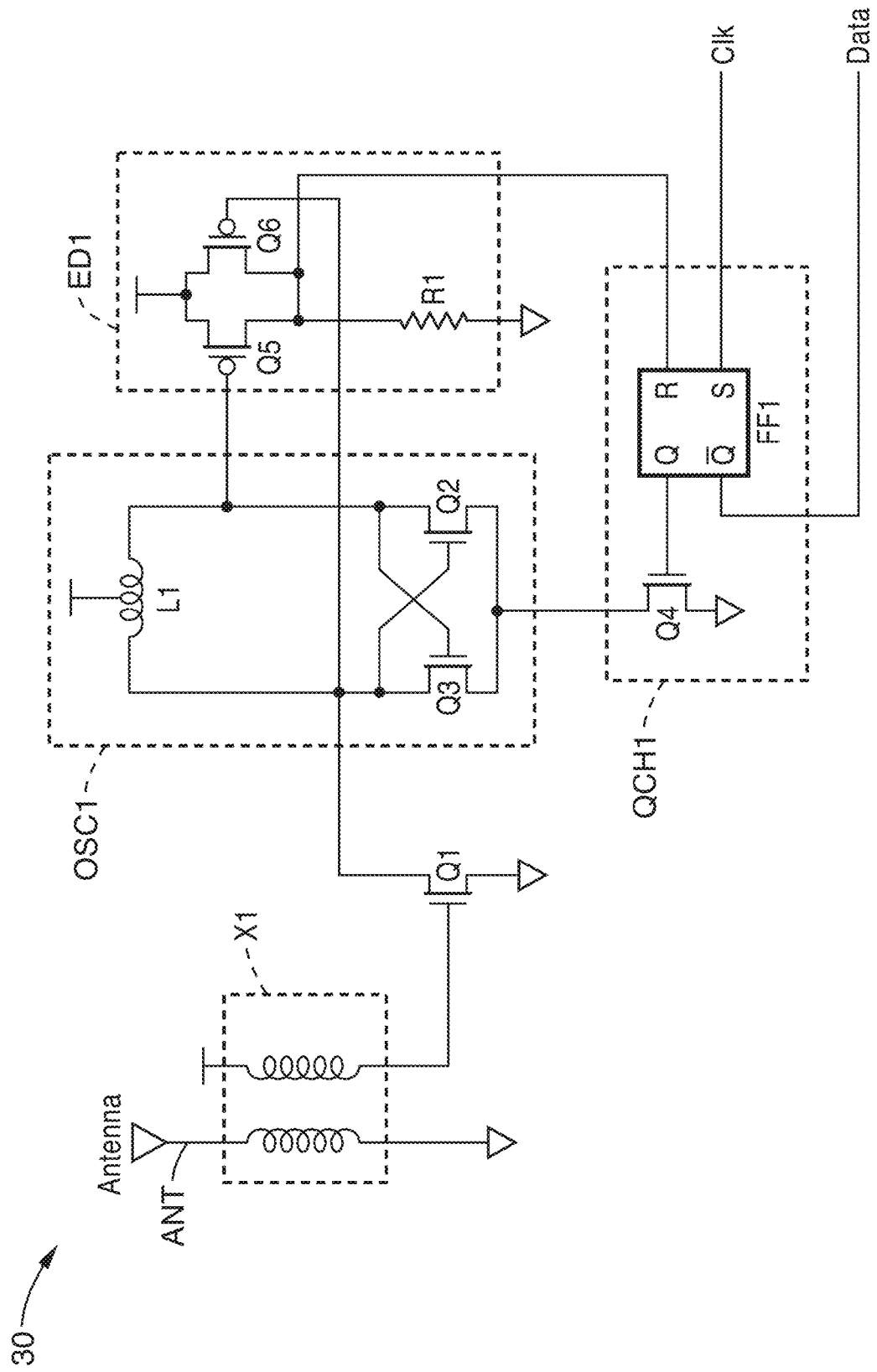
FIG. 4 is a schematic of a digital regenerative receiver (DRR) circuit implemented in CMOS according to an embodiment of the present invention.

FIG. 4 illustrates a detailed embodiment 30 of the DRR receiver implemented in 65 nm CMOS technology. An antenna ANT is coupled to transformer X1 which biases transistor Q1 and provides input injection into the oscillator stage OSC1 from the antenna ANT. Transistors Q2, Q3 and inductor L1 form the oscillator tank and negative resistance element. Transistors Q5, Q6 as well as resistor R1 form an envelope detector ED1. The oscillator on/off (activation) control is provided at current source transistor Q4 within a digital quench circuit QCH1 which includes digital latch FF1. A clock is periodically received for setting digital latch FF1 and allowing the oscillator OSC1 to start oscillating. The output from quench circuit QCH1 is used to reset the digital latch FF1 to change the state of transistor Q4 and terminate oscillations of the regenerative oscillator OSC1. The latch FF1 itself is preferably implemented as a standard CMOS digital logic block, and is shown as an RS Flip Flop having a clock (Clk) input on the set input (S), with a signal coupled from threshold detector ED1 being received at the reset input (R) of the latch FF1 whose outputs are exemplified as Q and Q' (also referred to as Q bar). It should be appreciated that the receiver requires only two DC bias currents as shown in the example embodiment, one flowing through transistor Q1 and the other flowing through transistor Q4. As the value of R1 is large, such as 200K Ohms, the DC current consumption of the envelope detector is almost negligible.

Figure 5:
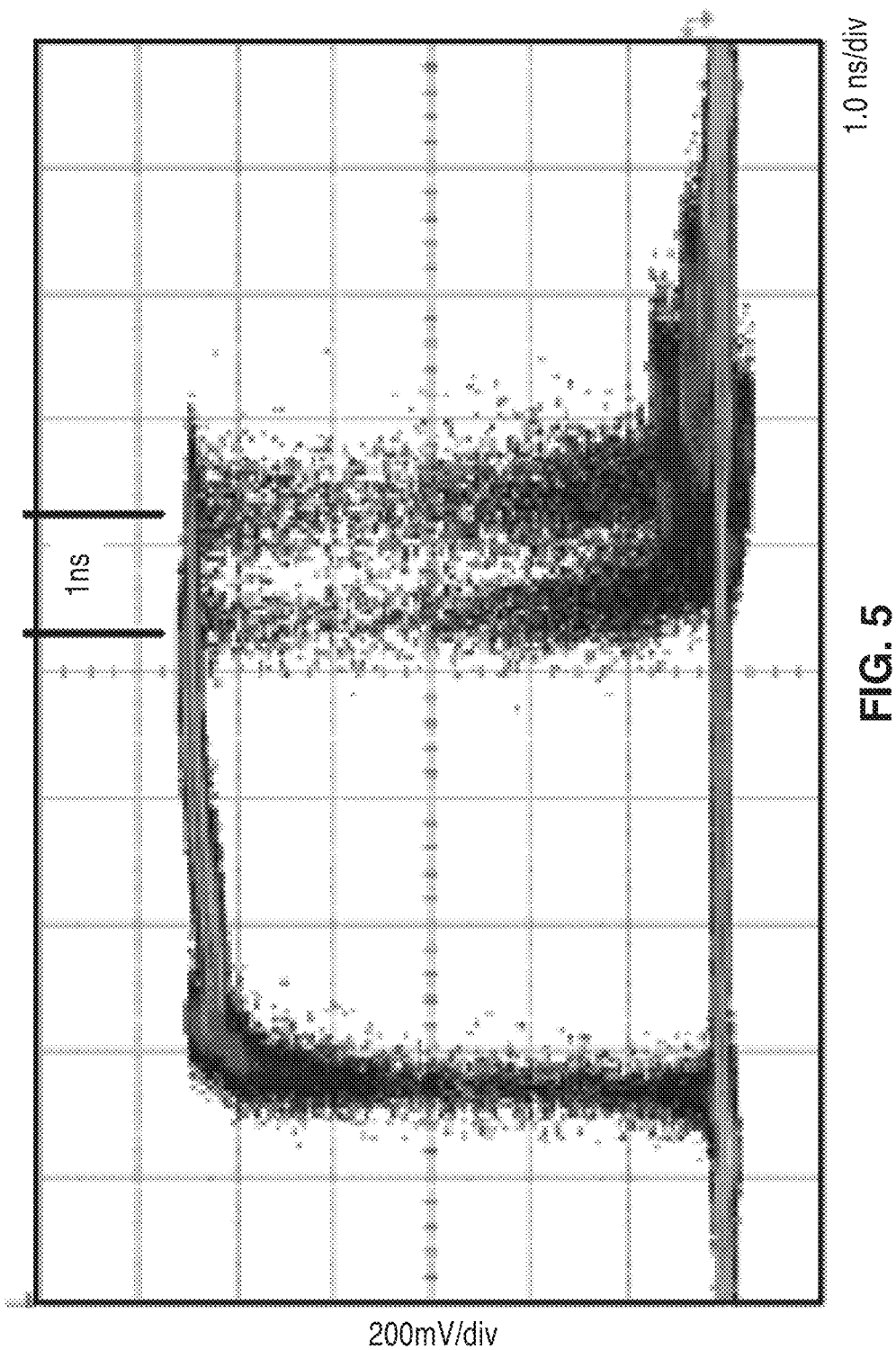
FIG. 5 is an eye-diagram waveform of a DRR receiver time-encoded pulse width according to an embodiment of the present invention.

FIG. 5 is an eye diagram displayed from an oscilloscope used to capture the time-encoded output of the DRR receiver in response to an applied 180 GHz input tone switched between two received power levels (−30 dBm and −50 dBm). The shorter envelope corresponds to the higher power, indicating that oscillation startup is enhanced in response to the received input power. In response to these quicker startup times, the corresponding time-encoded output signal will vary in pulse width by 1.0 ns as seen in the figure. Clearly visible is the time-encoded or pulse width change "dt" which verifies functioning of the digital regenerative receiver.

Figure 6:
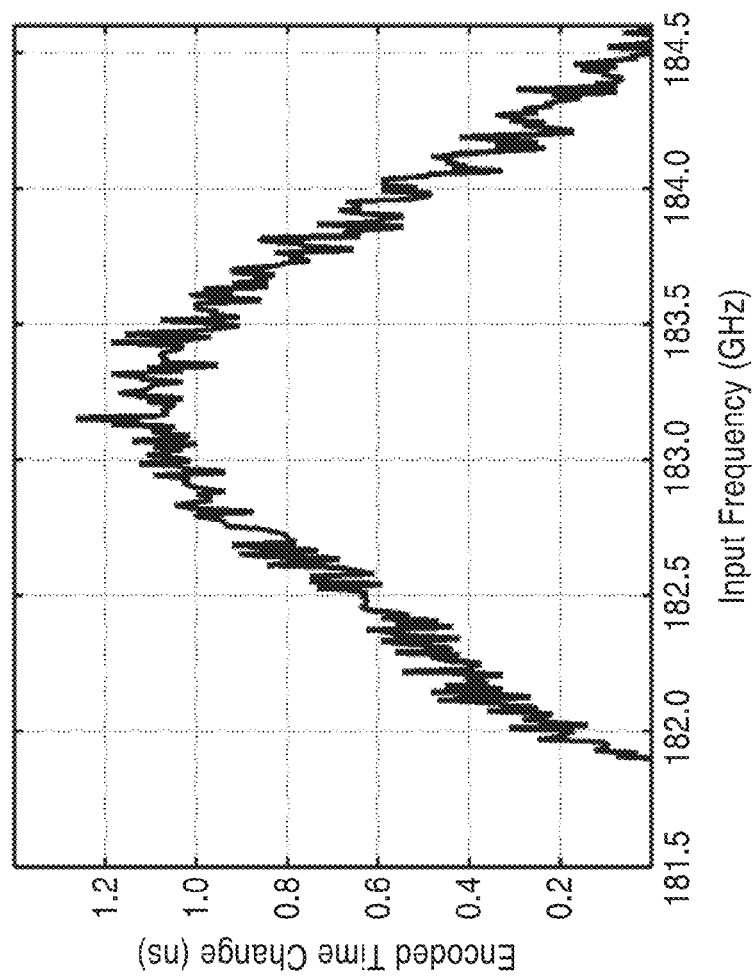
FIG. 6 is a graph of DRR bandwidth according to an embodiment of the present invention.

FIG. 6 depicts measured DRR bandwidth for the described embodiment. By way of example, the bandwidth of the DRR was determined by applying a −30 dBm tone to its input and sweeping the frequency through the receiver bandwidth while the output time-encoded difference was plotted at each frequency shown in the figure. If a 50% change in pulse-width is considered to be the 3 dB bandwidth of the receiver, then a receiver bandwidth of 1.4 GHz is demonstrated by the measurement data.

Figure 7A:
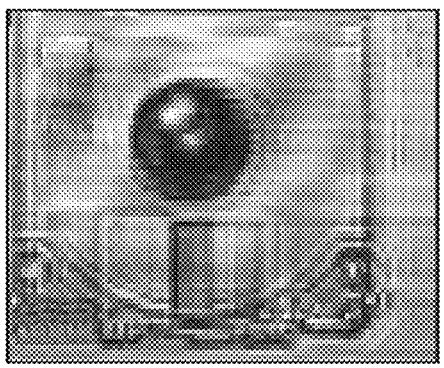
FIG. 7A through FIG. 7B are DRR images of concealed target objects (floppy disk and open-end wrench) according to an embodiment of the present invention.
Figure 7B:
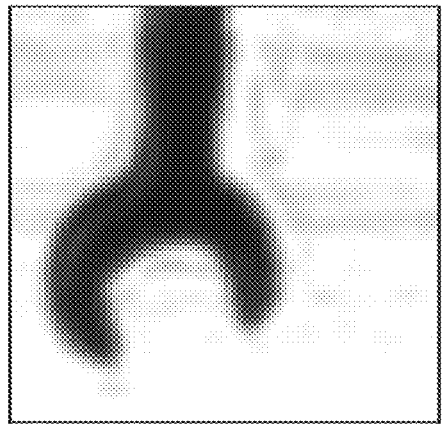

FIG. 7A and FIG. 7B depict imaging performed by the DRR receiver on two readily identifiable items, specifically shown are a floppy disk and open-end wrench, placed inside cardboard boxes and illuminated with a 180 GHz source (VDI) at 0 dBm. The cardboard boxes were scanned using the CMOS DRR mounted on a digitally controlled moving mechanical stage, from which the images were captured as shown in the figure. Clearly visible through the cardboard box are the internal parts of a computer floppy disk in FIG. 7A and the metallic open-end wrench in FIG. 7B.

Figure 8:
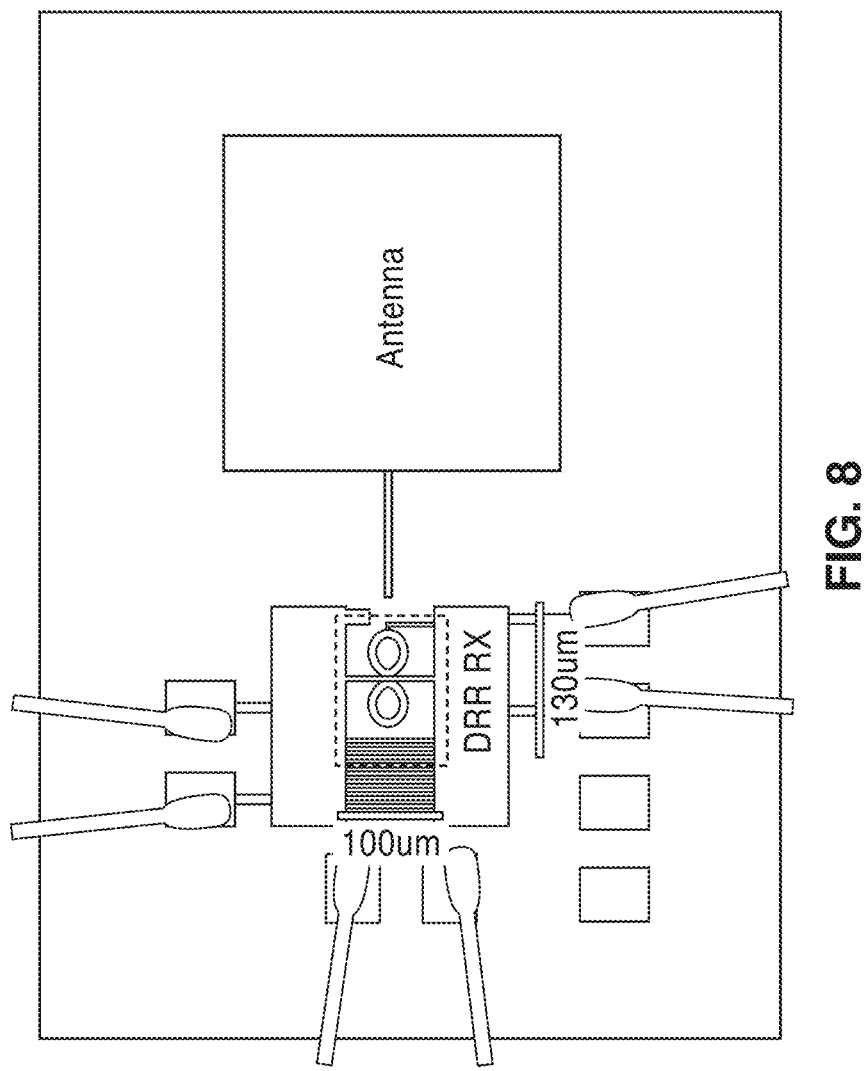
FIG. 8 is an image rendition of a fabricated die for a DRR receiver with on-chip patch antenna according to an embodiment of the present invention.

FIG. 8 shows an image rendition of a photograph taken of a DRR die implemented in 65 nm CMOS and having an on-chip half-wave patch antenna. The DRR area of the die is denoted by the dashed lines, and is shown covering an area which is 100 μm wide with a length of 130 μm. Wire connections are depicted extending from the periphery of the die. In at least one alternate embodiment, the antenna can be positioned vertically above the DRR, such as utilizing a thick (2 mils) spin-on polyimide to provide separation. It will be noted that the oscillator in the basic receiver circuit need not be fabricated with an integral antenna, as the antenna may be added to the pixel cell at any time, such as in a layer or other structure proximal the DRR circuit, such as over the top of the DRR circuit. Alternatively, an array of DRR receivers may be fabricated on a first substrate, which is coupled to an array of antennas fabricated on a second substrate. It will be appreciated by one of ordinary skill in the art that various forms of antennas can be coupled to the receivers in various ways without departing from the teachings of the present invention.

Figure 9:
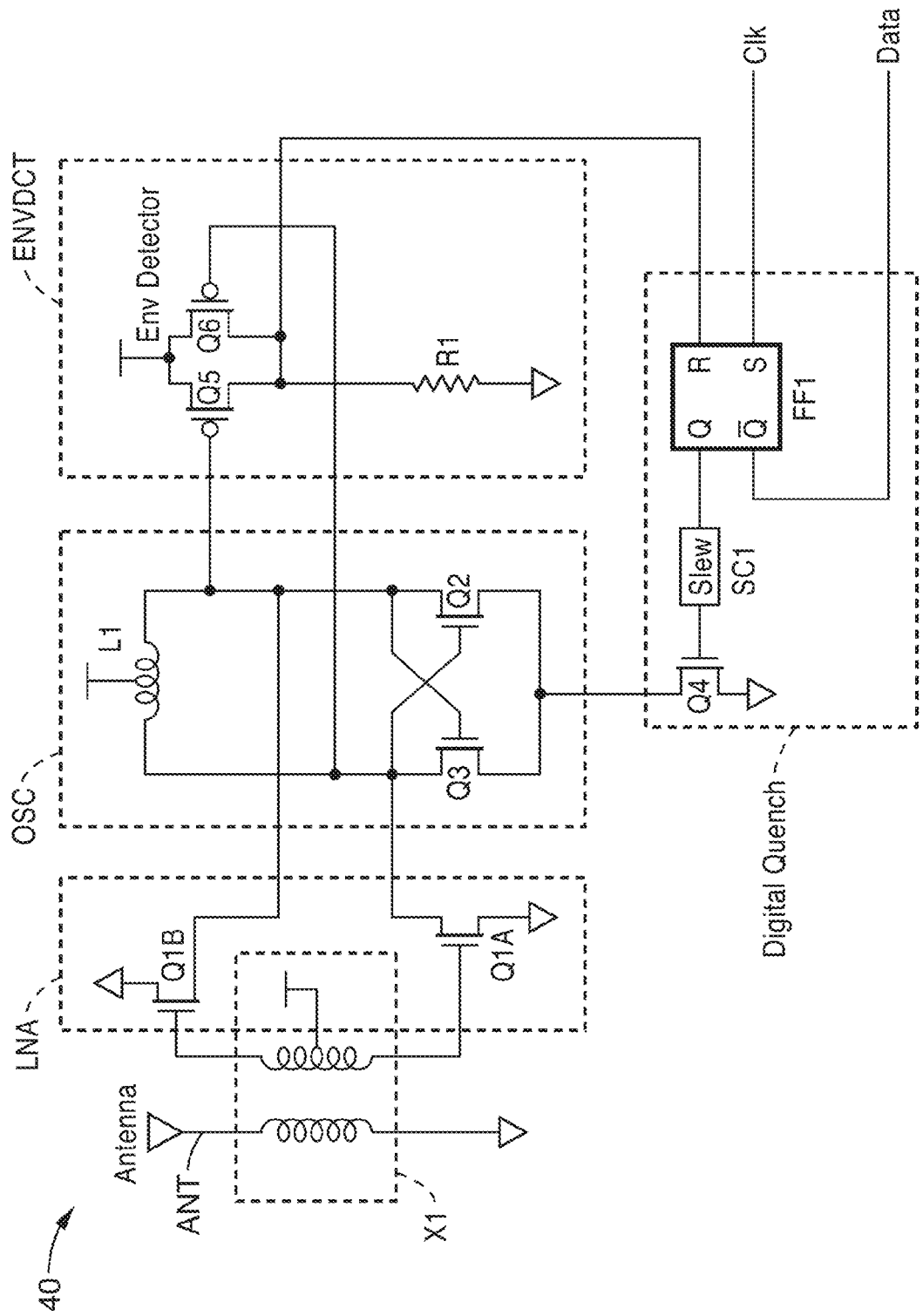
FIG. 9 is a schematic of an alternative digital regenerative receiver (DRR) circuit implemented in CMOS according to an embodiment of the present invention.

FIG. 9 illustrates an alternative embodiment 40 of the DRR shown in FIG. 4 with an antenna ANT, transformer X1, low noise amplifier LNA, regenerative oscillator OSC, envelope detector ENV DCT, and digital quench circuit (Digital Quench). The signal from the antenna ANT is coupled to an oscillator OSC by a low noise amplifier LNA stage shown with transistors Q1A and Q1B that shares the same inductive load L1 as the oscillator OSC. It will be noted that for the sake of simplicity the LNA and OSC are shown in separate dashed line areas, although they overlap in view of sharing the same load inductor of the oscillator. Sharing the inductor guarantees that the frequency of the oscillator and LNA will be well-aligned. It should be appreciated that other methods of signal injection can also be adopted which include current and voltage injection techniques from injection-locked oscillator theory. The LNA approach operated particularly well in simulations.

The regenerative oscillator is shown comprising transistors Q2 and Q3 in a tank circuit with inductor L1. A tail device comprising source transistor Q4 controls activation and deactivation of the oscillator OSC. A resistive differential envelope circuit (ENV DCT) is depicted comprising transistors Q5 and Q6 along with resistor R1, which tracks the oscillation envelope and triggers the reset on latch FF1 (e.g., digital SR latch) of the digital quenching circuit (Digital Quench) when the digital threshold voltage is reached. Latch FF1 receives a clock input (Clk), shown connected to a set input, and is depicted with outputs (Q and Q' (also referred to as Q bar)). The relative threshold levels between oscillator and digital circuit can be adjusted in the design by changing the value of the resistor (R1).

A slew limited device SC1 is shown coupled to the gate of pass transistor Q4, which limits the slew rate of the digital circuit to reduce the broadband switching noise coupling into the oscillator that can interfere with operation. Adjusting the maximum slew rate will also change receiver sensitivity and sample time.

Table 1 summarizes measured DRR receiver performance.

Table 2 provides a comparison of DRR with other current millimeter wave imaging receivers. In particular, the results from the DRR invention are compared in this table against results obtained from the following recent imaging mechanisms:

(1) MWCL 2008: as described in the paper by K. B. Cooper, R. J. Dengler, G. Chattopadhyay, E. Schlect, J. Gill, A. Skalare, I. Mehdi, P. H. Siegel, "A High-Resolution Imaging Radar at 580 GHz", IEEE Microwave and Wireless Component Letters, Vol. 18, No. 1, January 2008. pp 64-66.

(2) RFIC 2010: as described in the paper by Gilreath L, Jain V, Hsin-Cheng Yao, Le Zheng, Heydari, P, "A 94-GHz passive imaging receiver using a balanced LNA with embedded Dicke switch", IEEE RFIC, May 2010, pp 79-82.

(3) CICC 2007: as described in the paper by Tang, K. W, Khanpour M, Garcia P, Garnier, C, Voinigescu, S. P, "65-nm CMOS, W-Band Receivers for Imaging Applications", IEEE CICC, September 2007, pp 749-752.

The NF and NEP values provided in the table were determined from the sensitivity and bandwidth measurements. The total DRR power dissipation is measured as 13.5 mW/pixel while occupying only $1.31 \times 10^4$ μm$^2$/pixel of device area. These measured values are at least 7× and 20× greater, respectively, than the corresponding power and area of prior art approaches.

One of ordinary skill in the art will appreciate that the inventive DRR can be implemented with numerous circuit variations without departing from the teachings of the present invention.

2. Multi-Band Inter-Modulated Regenerative Receiver (IRR).

In this section, a receiver apparatus is described which extends the above advantages of size, power-consumption, noise, sensitivity and dynamic range, into a multi-band apparatus providing additional benefits.

It will be noted that narrowband approaches (single frequency) suffer from narrowband imaging effects which include edge ghosting, speckle, and a limited ability to discriminate between different materials in the scene. Toward increasing the practicality of millimeter and sub-millimeter imaging, high operating frequencies are necessary as the operating frequency limits the spatial or "cross" resolution (wavelength dependent).

In the previous section, an imaging receiver was presented based on the principle of super-regeneration in which start up time for the oscillator is perturbed by an active imaging signal, wherefrom a time difference is detected. The described inventive embodiments provide excellent area and power performance compared with other techniques, while providing a narrowband response with an upper frequency limited by $F_{max}$, (highest frequency with device gain available).

An inter-modulated regenerative receiver (IRR) is described, which enhances the beneficial characteristics of the DRR device described in the previous section, in response to the use of multiple oscillators. In particular, an embodiment is described of a 349 GHz 18.2 mW/pixel CMOS inter-modulated regenerative receiver for color millimeter and sub-millimeter wave imaging.

Figure 10B:
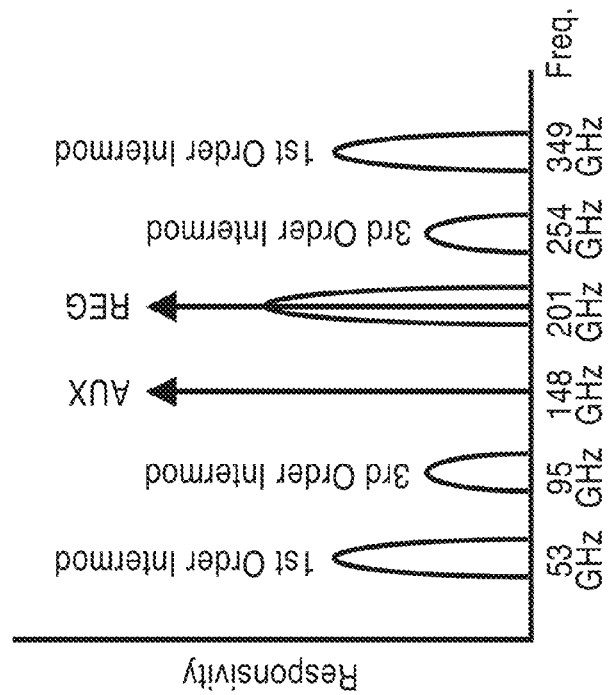
FIG. 10A through FIG. 10B are a block diagram of an inter-modulated regenerative receiver (IRR) configured for multiple frequency operation according to an embodiment of the present invention shown alongside key frequencies.
Figure 10A:
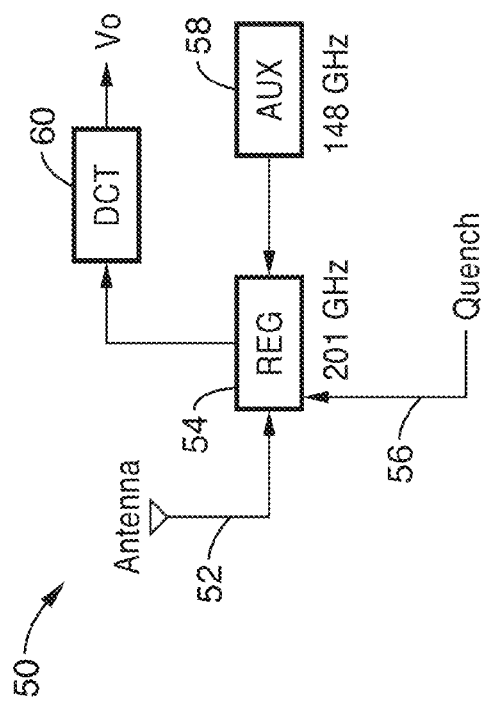

FIG. 10A and FIG. 10B illustrate an embodiment of an inter-modulated regenerative receiver (IRR) embodiment 50 having multiple oscillators, which is shown with key frequencies. In FIG. 10A, an antenna 52 is shown coupled to a regenerative first oscillator 54 (REG) whose output is received by an envelope detector 60 (DCT) which generates output signal Vo. The first oscillator is modulated in response to a quench input 56 (Quench) and an auxiliary oscillator input 58 (AUX).

The first oscillator has a fundamental frequency which is greater than the second oscillator; in particular the first oscillator is depicted with a fundamental frequency of 201 GHz with the second oscillator depicted at a fundamental frequency of 148 GHz. The IRR device of the invention can concurrently receive in multiple bands to approximate a broadband image.

In this apparatus, a regenerative receiver (REG) configured with digital quenching as described in the previous section for a first frequency (e.g., 201 GHz). A lower frequency tone is then directly injected from an auxiliary oscillator (AUX) (e.g., 148 GHz). Unlike the regenerative oscillator (REG) which is periodically quenched (e.g., at 1 GHz), the auxiliary oscillator (AUX) runs continuously. As the first oscillator is highly non-linear, the injection of signal (at second oscillator frequency) from the auxiliary (aux-tone) creates inter-modulation between both frequencies within the regenerator and gives rise to additional receive bands.

In FIG. 10B key frequencies are depicted in a graph in relation with their relative responsivity, in particular the fundamental frequencies for the first (REG) oscillator and second (AUX) oscillator, first order inter-modulation frequencies, and third-order inter-modulation frequencies. The first order inter-modulation components (e.g., 53 and 349 GHz in the example shown) are particularly interesting for imaging as they offer responsivities and noise equivalent powers (NEP) within an order of magnitude of that provided at the fundamental frequency.

It should also be appreciated that the upper inter-modulation component (349 GHz) can be designed to lie well above $F_{max}$ (250 GHz for 65 nm), which surprisingly allows the receiver to operate above frequencies where transistor device gain is available, a phenomenon not possible with other conventional receiver topologies. Parameter $F_{max}$ is the upper limit of achievable transistor speed for a given manufacturing process. For example TSMC process at 65 nm has $F_{max}$=250 GHz, UMC at 90 nm has $F_{max}$=110 GHz, and IBM45 nm process has an $F_{max}$=260 GHz. Accordingly, any transistor made in the TSMC process 65 nm will only have gain below 250 GHz, and any transistor made in UMC 90 nm will only have gain below 110 GHz. The upper limit on the operating frequency of the first oscillator (REG) remains $F_{max}$ to sustain oscillation, while the limit on the second oscillator (AUX) is not so constrained and more complicated. If the aux frequency is placed too close to the regenerative frequency, the two oscillators may become injection locked, whereby the mechanism for generating multiple bands will be defeated. It should also be appreciated that it is possible to receive higher-order inter-modulated frequencies, however, responsivity and NEP would be more limited.

Figure 11:
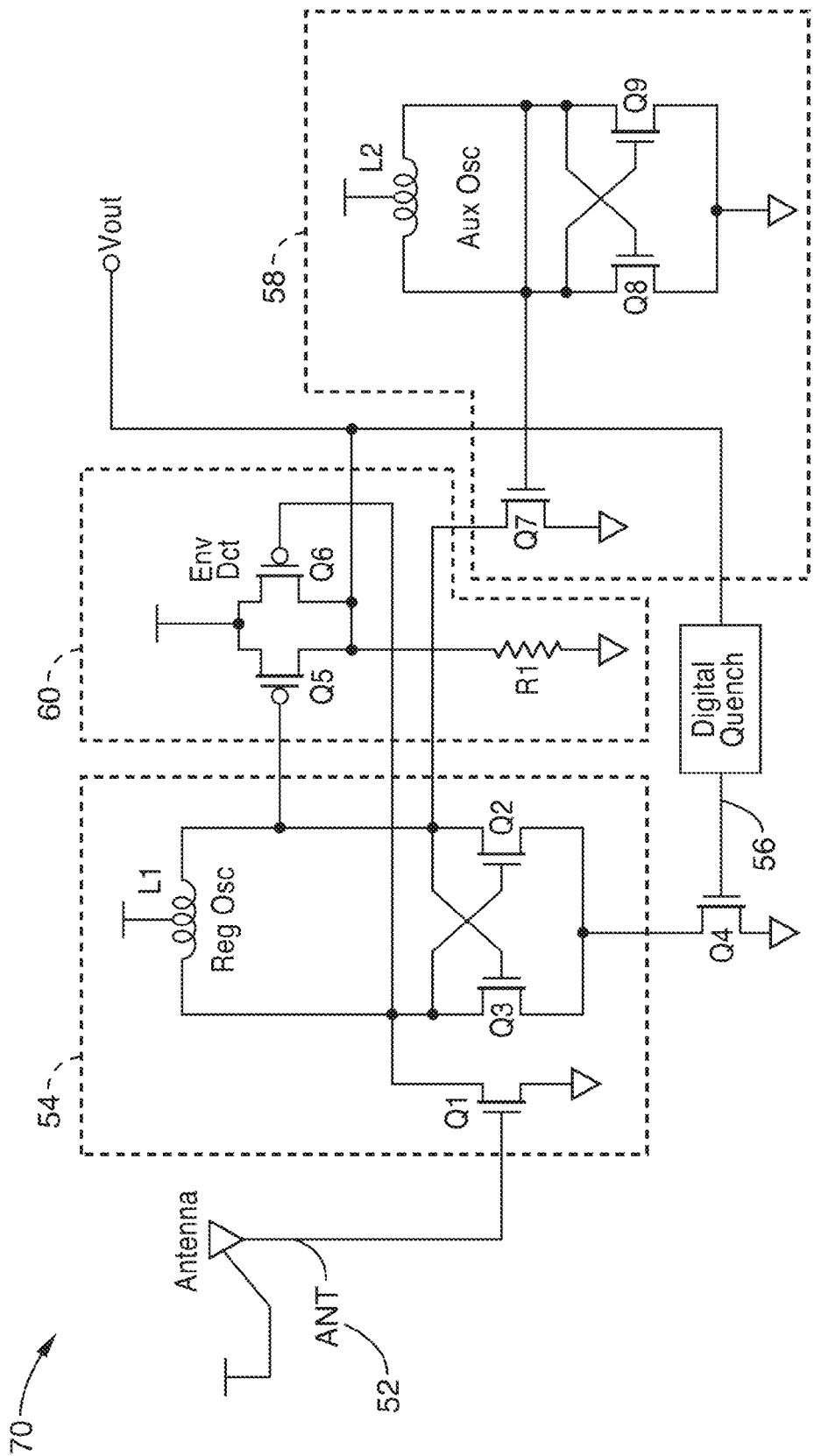
FIG. 11 is a schematic of an inter-modulated regenerative receiver (IRR) according to an embodiment of the present invention.

FIG. 11 illustrates a detailed example embodiment 70 of an IRR device, exemplified as implemented in a 65 nm CMOS technology, which was shown in FIG. 10A. An antenna (ANT) 52 is shown coupled to an amplifier comprising Q1 shown within the regenerator oscillator 54. By way of example and not limitation, the antenna is coupled as a DC null to $V_{DD}$ mode. It should be noted that a regular half-wave patch antenna was utilized for prototype embodiments, in view of its ease of implementation in CMOS technology; however, the embodiments of both the DRR and IRR devices can be fabricated with any desired antenna configuration. Amplifier stage utilizing transistor Q1 is depicted in this example as having no gain, which prevents this low impedance antenna from loading the regenerative oscillator (Reg Osc) 54.

An envelope detector (Env Dct) 60 is shown comprising transistors Q5 and Q6 along with threshold control resistor R1, and having an output $V_{out}$ utilized by the digital quench circuit. The envelope detector converts the reg-osc envelope into a base-band output signal. Although the figure depicts the digital quench circuit being proximal the oscillator and other circuits depicted here, it can be located off-chip insofar as signals $V_{out}$ are output and a quench signal input are provided, as is later depicted in the IRR die shown FIG. 13.

Transistors Q2 and Q3 in combination with inductor L1 form the reg-osc which is periodically quenched in response to the operation of current source Q4 receiving a quench signal 56 from a digital quench circuit (Digital Quench). It should be noted that specific embodiments of the quench circuit were previously shown in FIG. 1A, FIG. 4, and FIG. 9, by way of example and not limitation. It will be appreciated that the digital quench circuit can be configured in a number of alternative ways for digitally quenching the oscillator, in response to receiving envelope and clock signals, while giving rise to a digital output which contains time encoded pixel image intensity information in a digital form.

An auxiliary oscillator, second oscillator, (Aux Osc) 58 is shown formed from cross-coupled transistors Q8 and Q9 in combination with inductor L2 which provides the injected tone through a current injection device exemplified as transistor Q7.

It should be noted that no matching structure (e.g., no transformer X1) is depicted between the antenna and Q1, in view of the broadband nature of the example (50 to 350 GHz) wherein the antenna could not be simultaneously tuned across this broad frequency range. Instead of tuning the antenna coupling, the high gain of the regenerative stage is utilized to overcome the losses while still providing needed performance.

A test setup was configured (not shown) for quantifying the responsivity and NEP of the proposed IRR device. In the test setup a backwards-wave oscillator (BWO) was employed to test the 349 GHz band while an active multiplier chain (AMC) from VDI Incorporated® was used to characterize the 53 and 201 GHz bands. An attenuator and power meter were placed at each source output while the receiver was placed at a distance and focused upon through a lens. The output voltage of the IRR was recorded as power was swept while the voltage noise floor was measured with a spectrum analyzer. Finally the IRR and power meter position were exchanged so the path loss could be measured to obtain the true power incident on the IRR.

Figure 12B:
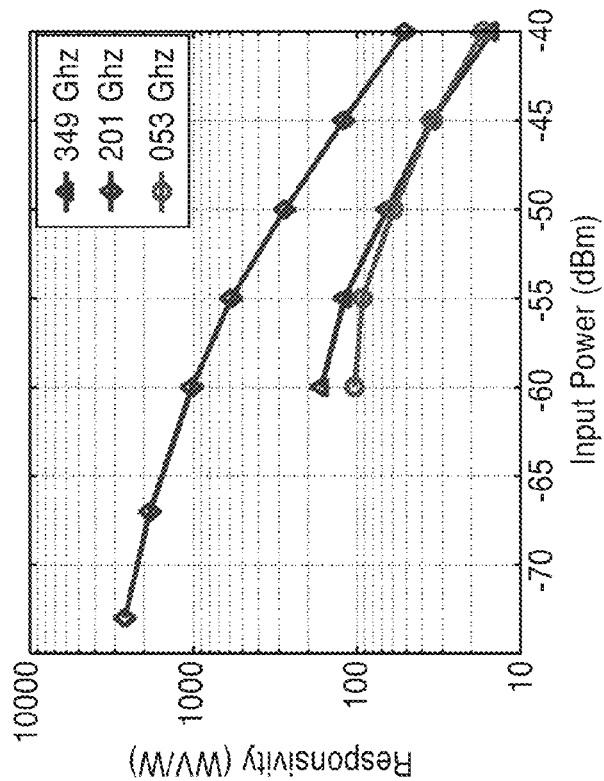
FIG. 12A through FIG. 12B are graphs of noise equivalent power (NEP) and responsivity with respect to received input power for an IRR device according to an embodiment of the present invention.
Figure 12A:
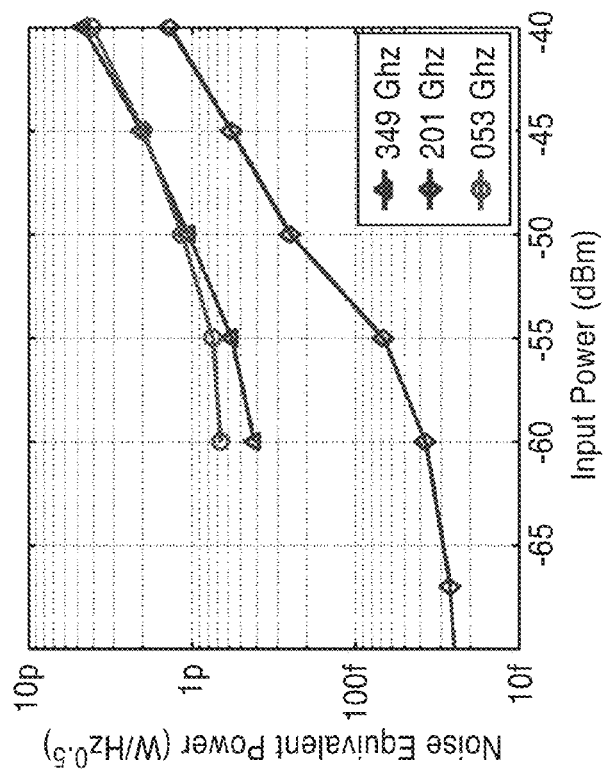

FIG. 12A and FIG. 12B depict noise equivalent power (NEP) as well as measured responsivity for each of multiple bands of operation, (shown at 349, 201 and 53 GHz frequencies) across a range of input power levels for the IRR device configuration of FIG. 11. It should be noted that although the inter-modulated bands exhibit lower performance than the fundamental frequency, they compete favorably with other approaches.

Figure 13:
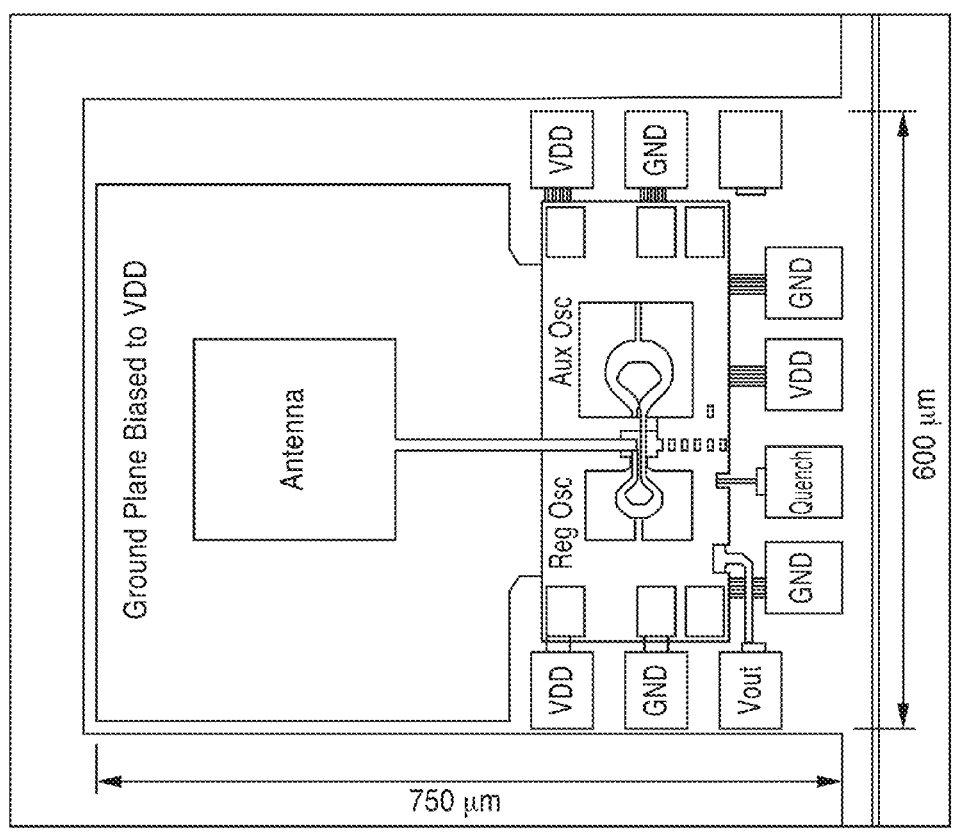
FIG. 13 is an image rendition of a fabricated die for an IRR receiver with on-chip patch antenna according to an embodiment of the present invention.

FIG. 13 depicts an image rendition of a photograph taken of a fabricated IRR device die implemented in 65 nm CMOS including an on-chip patch antenna. As can be seen from the figure, a patch antenna is shown integrated over a ground plane biased to $V_{DD}$. The antenna is shown coupled to a regenerative oscillator (Reg Osc), shown coupled to an auxiliary oscillator (Aux Osc). The digital quench circuit is not shown implemented on the die, but configured to receive an off-line quench signal (Quench), in response to output from the die of threshold output $V_{out}$. Pads are shown on one of the device die for connection of $V_{out}$, Quench, along with multiple $V_{DD}$ and GND signals. The DRR receiver die area is shown as being 600 um wide by 750 um long. It will be noted that an array of DRR or IRR devices can be implemented on a single die which is larger than the one shown and would have signal connection pads about its periphery for the common signals and output from the receivers. It will also be appreciated by one of ordinary skill in the art that the digital signals from an array of DRR or IRR receivers can be combined in various ways, such as time multiplexing, to reduce device area needed for signal routing, while simplifying image processing operations. By way of example and not limitation, a simple multiplexing scheme can be configured by sequentially clocking DRR or IRR circuits whose outputs are combined into a single time multiplexed signal, wherein signals from a plurality of the pixel receivers are combined onto a single signal wire which simplifies both routing and signal processing.

To demonstrate transmission-mode imaging operation according to the example shown in FIG. 13, an XY translation stage was placed between the IRR and each source. A target was placed on the stage and scanned. The scan was performed at three different frequencies and the results assigned false colors based on the wavelengths.

While each of the narrowband scans provide only limited scene information, the composite image provides significantly improved discrimination between materials. For example, the target (e.g., stuffed bear) was sitting on a styrofoam block, which offers the dominant transmission coefficient at low frequencies, whereby 53 GHz (with a false color assigned as 'red') was the dominant color over the other channels. The bear's nose showed up mostly in the 53 GHz (red) and 201 GHz (green) indicating that the 349 GHz band is heavily attenuated in this region. The body region of the bear appeared to transmit best at the 201 GHz band (green). It should be noted that all three source powers and responsivities were equalized to the same value by using an external digital signal processor (DSP) to provide fair relative contrasts in the final image. Finally, the reflective setup was used to capture reflective images. It will be noted that reflective mode imaging may be constrained to the fundamental frequency of the regenerative receiver, if long path lengths, and/or if insufficient signal power is available.

Table 3 summarizes IRR receiver performance. Table 4 provides a comparison of IRR with other current millimeter wave imaging receivers. In particular, the results from the IRR invention are compared against results obtained from:

(1) JSSC 2009: described in the paper by Erik Ojefors, Ullrich R.Pfeiffer, Alvydas Lisauskas, Hartmut G. Roskos, "A 0.65 THz Focal-Plane Array in a Quarter-Micron CMOS Process Technology", *IEEE JSSC*, Vol. 44, No. 7, July 2009, pp 1968-1976.

(2) RFIC 2010: described in the paper by Gilreath L, Jain V, Hsin-Cheng Yao, Le Zheng, Heydari, P, "A 94-GHz passive imaging receiver using a balanced LNA with embedded Dicke switch", *IEEE RFIC, May* 2010, pp 79-82.

(3) CICC 2007: described in the paper by Tang, K. W, Khanpour M, Garcia P, Garnier, C, Voinigescu, S. P, "65-nm CMOS, W-Band Receivers for Imaging Applications", *IEEE CICC*, September 2007, pp 749-752.

(4) ISSCC 2011: described in the paper by Adrian Tang and Mau-Chung Frank Chang, "183 GHz 13.5 mw/pixel CMOS Regenerative Receiver for mm-wave imaging applications", *IEEE ISSCC*, Vol 54, February 2011, pp 296-297.

The IRR is unique in the ability to offer three color images in at least one mode. In the described example, the transmission mode was in color (e.g., three false colors) while the reflective mode was depicted in monochrome (e.g., black and white). The IRR provided an excellent compromise between detector area, power and frequency while providing sufficient NEP. The frequency, power and area are competitive to the single band regenerative approach described in the first section while providing the additional image bands. The total IRR power dissipation was measured at 18.2 mW/pixel. The IRR occupies 0.45 mm$^2$/pixel of area including antenna.

One of ordinary skill in the art will appreciate that the inventive IRR can be similarly embodied in various ways with numerous circuit variations without departing from the teachings of the present invention.

3. Antenna-less Super Regenerative Receiver (ASRR).

In another embodiment of our invention, a regenerative receiver is constructed without an antenna. Our antenna-less design allows for a much smaller pixel size and area than is possible with any other receiver reported. Quench synchronization allows for multiple regenerative receivers to be used in a focal plane array enabling, for example, the possibility of constructing a full mm-wave camera.

Figures 14, 15:
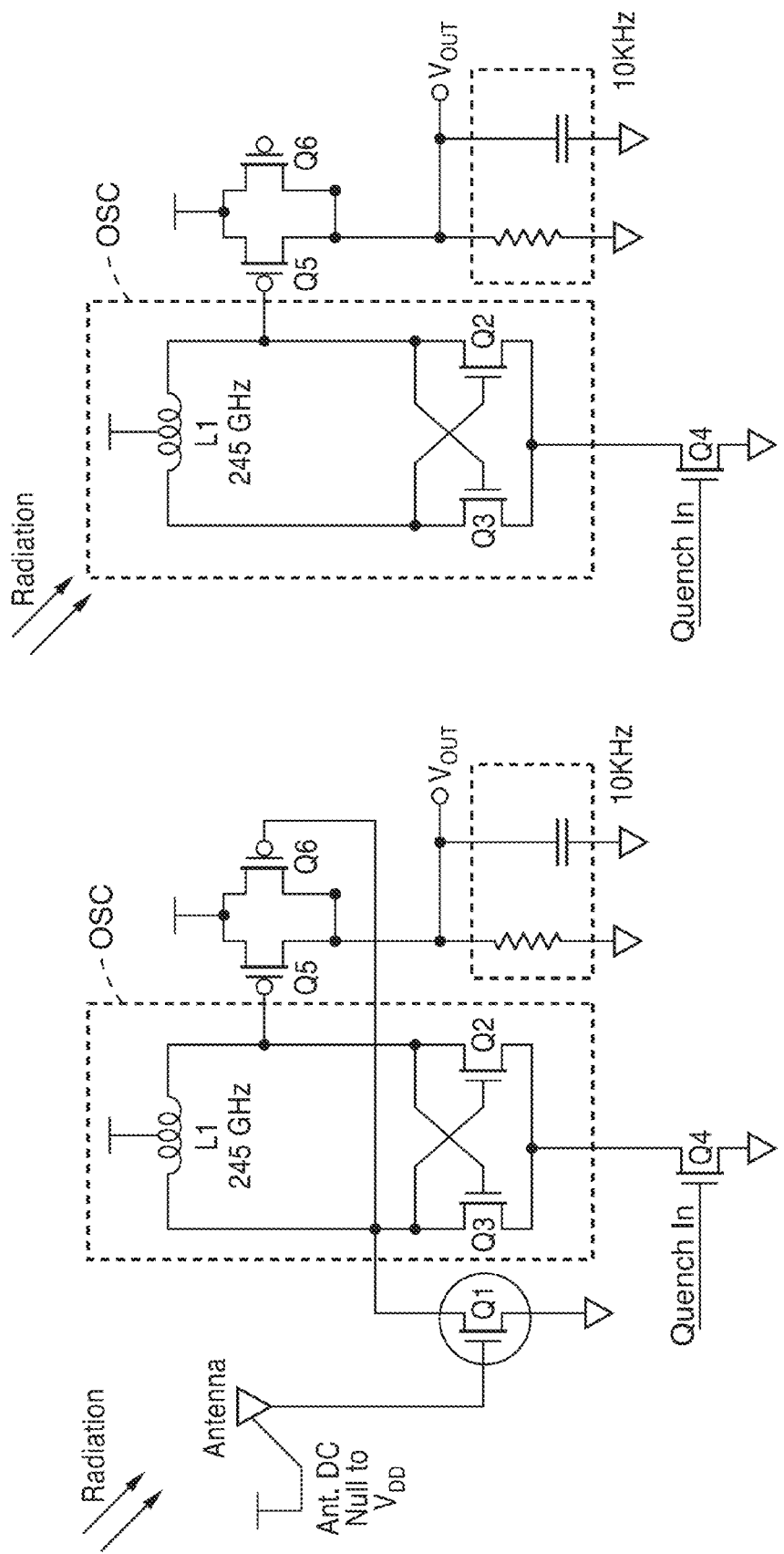
FIG. 14 and FIG. 15 are schematic diagrams illustrating the difference in configuration between a SRR with a conventional antenna (FIG. 14) and an antenna-less configuration according to an embodiment of the invention where the antenna and input transistor shown in FIG. 14 have been removed (FIG. 15).
Figure 17:
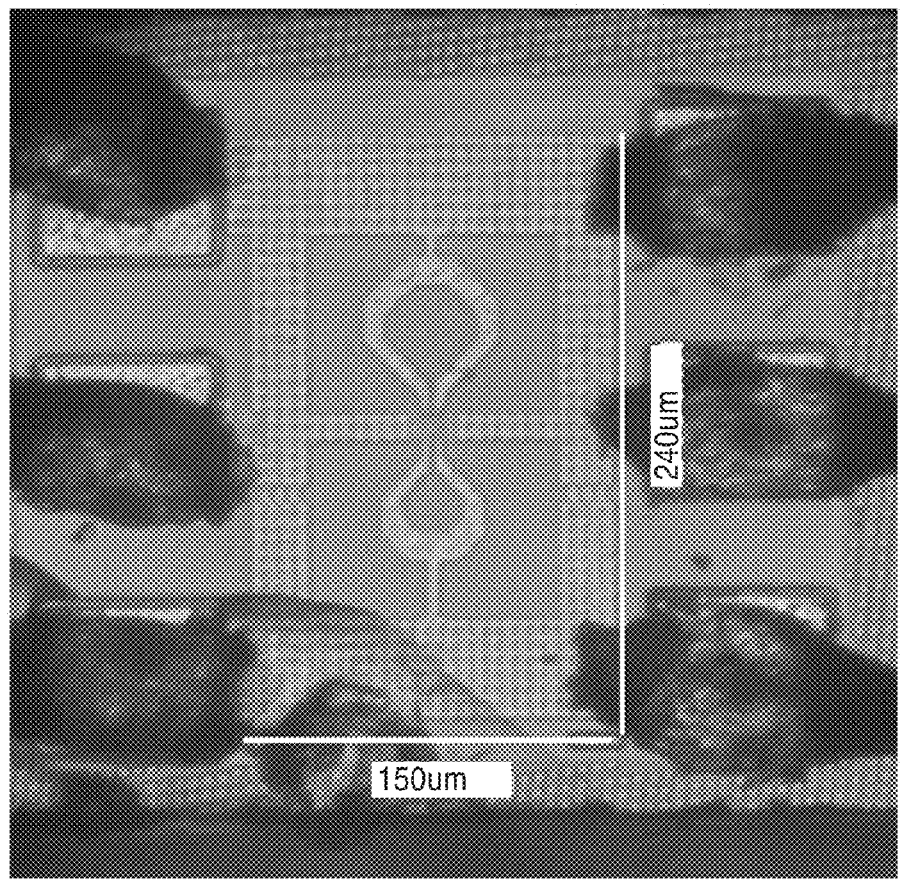
FIG. 16 and FIG. 17 are die photos illustrating the difference in configuration between a SRR with a conventional antenna (FIG. 16) and an antenna-less configuration according to an embodiment of the (FIG. 17).
Figure 16:
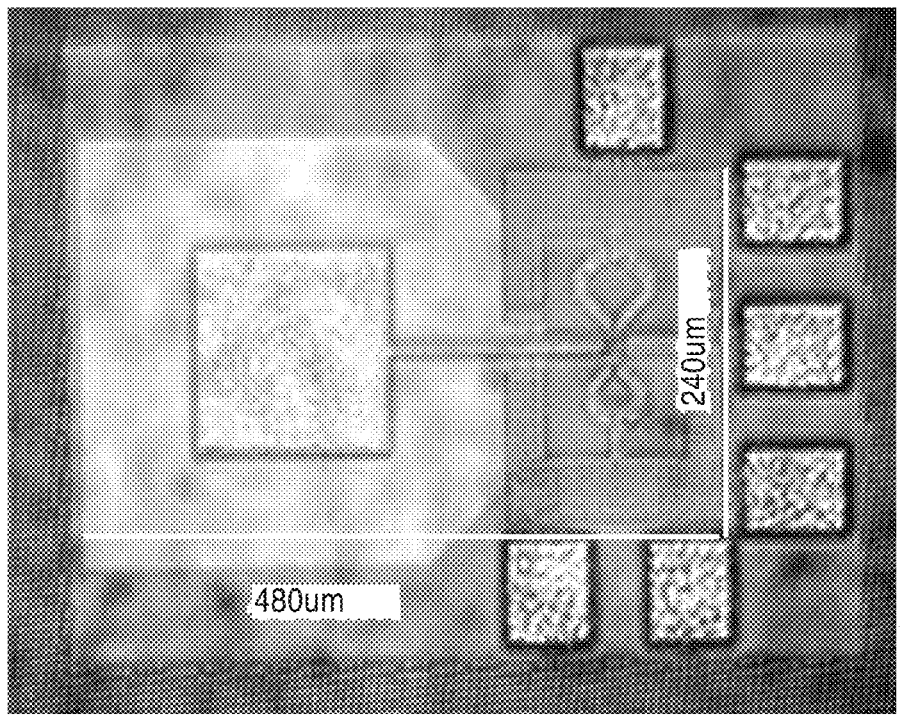

FIG. 14 is a schematic diagram of a super regenerative receiver (SRR) with a conventional antenna configuration. FIG. 15 is a schematic diagram of our antenna-less version, which is achieved by removing the antenna and input transistor. In the embodiment of our invention shown in FIG. 15, the inductors of the oscillator (OSC) itself are used to capture the incoming radiation. FIG. 16 shows a die photo of the SRR with a conventional antenna configuration, and FIG. 17 shows a die photo of our antenna-less regenerative receiver. The compactness of our antenna-less configuration shown in FIG. 17 as compared to a configuration with an antenna is significant. For example, we reduced the receiver size from 240 μm×480 μm (FIGS. 16) to 240 μm×150 μm (FIG. 17).

Our antenna-less configuration can also be applied to DRR and IRR receiver architectures generally, including those previously described herein. Removing the antenna also allows the input transistor to be removed from the receiver, thereby resulting in significant noise reduction. For example, FIG. 18 illustrates noise in an SRR having a conventional antenna configuration, and, for comparison, FIG. 19 illustrates noise in our antenna-less SRR configuration.

We found that placing multiple regenerative receivers of any type (DRR, IRR, SRR) in an array with different quench frequencies or phase, interference is observed as shown in FIG. 20 and FIG. 21. FIG. 20 shows time domain captures of the output of two SRRs in an array when quench signals are at different frequencies (Q1<>Q2). FIG. 21 shows comparative time domain captures when the quench signals are synchronized with an H-tree. By using an H-tree structure to balance and distribute the quench signal as shown in FIG. 21, quenches become synchronized allowing the array to operate correctly.

FIG. 22 shows a 4×4 focal plane array of 200 GHz IRRs implemented on a PCB board. Visible is the H-tree used to make sure the quench signal is correctly synchronized in both phase and frequency between each receiver in the array.

From the description herein, it will be further appreciated that the invention can be similarly embodied in various, which include but are not limited to the following.

The present invention provides methods and apparatus for millimeter and sub-millimeter imaging. Inventive teachings can be applied in a variety of apparatus and applications.

As can be seen, therefore, the present invention includes the following inventive embodiments among others:

1. An apparatus for receiving millimeter and sub-millimeter wavelength imaging comprising: an antenna configured for receiving millimeter and sub-millimeter wavelengths; a regenerative oscillator configured oscillating at a first frequency in response to receiving a signal from said antenna; an envelope detector coupled to an output of said regenerative oscillator, said envelope detector configured for generating a digital envelope threshold output in response to detecting that the oscillation envelope has reached a threshold; and a digital quench circuit coupled to said regenerative oscillator for activating and deactivating said regenerative oscillator in response to receiving said digital envelope threshold output, and for generating a time encoded digital signal in response to pixel amplitude during millimeter and sub-millimeter wavelength imaging.

2. The apparatus as recited in embodiment 1, wherein oscillator startup time in said regenerative oscillator is inversely proportional to injected power of said pixel amplitude.

3. The apparatus as recited in embodiment 1, wherein said apparatus generates a digital output in response to said pixel amplitude without the need of an analog-to-digital converter.

4. The apparatus as recited in embodiment 1, wherein said apparatus is integrated within an imaging array in which said time encoded digital signal from each element of said imaging array is routed through said imaging array.

5. The apparatus as recited in embodiment 1, wherein said digital quench circuit comprises a latch which is configured for being set in response to receipt of a clock signal and reset in response to receipt of an output from said envelope detector.

6. The apparatus as recited in embodiment 1, further comprising a low-noise amplifier stage coupled between said antenna and said regenerative oscillator, said low-noise amplifier stage shares a load inductor with said regenerative oscillator.

7. The apparatus as recited in embodiment 1, further comprising a slew limiting circuit between said digital quench circuit and said regenerative oscillator for limiting the slew rate of the output from said digital quench circuit toward reducing broadband switching noise.

8. The apparatus as recited in embodiment 1, further comprising at least one auxiliary oscillator, configured for oscillating at a second frequency, which is coupled to said regenerative oscillator to create inter-modulation between oscillating frequencies of said regenerative oscillator and said auxiliary oscillator within said regenerator oscillator as additional receive bands allowing said apparatus to perform simultaneous imaging operation at multiple frequencies.

9. The apparatus as recited in embodiment 8, wherein said auxiliary oscillator oscillates continuously during operation.

10. The apparatus as recited in embodiment 8, wherein imaging is provided at fundamental and inter-modulation frequencies, and can perform both transmissive and reflective imaging.

11. The apparatus as recited in embodiment 8, wherein a no gain amplifier stage couples said antenna to said regenerative oscillator toward reducing loading of said regenerative oscillator by said antenna which has a low impedance.

12. An apparatus for receiving millimeter and sub-millimeter wavelength imaging, comprising: an antenna configured for receiving millimeter and sub-millimeter wavelengths; a regenerative oscillator configured oscillating at a first frequency in response to receiving a signal from said antenna with oscillator startup time inversely proportional to injected power from said antenna; an envelope detector coupled to an output of said regenerative oscillator, said envelope detector configured for generating a digital envelope threshold output in response to detecting that the oscillation envelope has reached a threshold; and a digital latch coupled to said regenerative oscillator for activating and deactivating said regenerative oscillator as a digital quench circuit triggered in response to receiving said digital envelope threshold output, and for generating a time encoded digital signal in response to pixel amplitude during millimeter and sub-millimeter wavelength imaging; and wherein said time encoded digital signal is generated from said digital latch in response to said pixel amplitude without the need of an analog-to-digital converter.

13. The apparatus as recited in embodiment 12, wherein said apparatus is integrated within an imaging array in which said time encoded digital signal from each element of said imaging array is routed through said imaging array.

14. The apparatus as recited in embodiment 12, wherein said digital latch is configured for being set in response to receipt of a clock signal and reset in response to receipt of an output from said envelope detector.

15. The apparatus as recited in embodiment 12, further comprising a low-noise amplifier stage coupled between said antenna and said regenerative oscillator, said low-noise amplifier stage sharing a load inductor with said regenerative oscillator.

16. The apparatus as recited in embodiment 12, further comprising a slew limiting circuit between said digital latch and said regenerative oscillator for limiting the slew rate of the output from said digital latch toward reducing broadband switching noise.

17. The apparatus as recited in embodiment 12, further comprising at least one auxiliary oscillator, configured for oscillating at a second frequency, which is coupled to said regenerative oscillator to create inter-modulation between oscillating frequencies of said regenerative oscillator and said auxiliary oscillator within said regenerator oscillator as additional receive bands allowing said apparatus to perform simultaneous imaging operation at multiple frequencies.

18. An apparatus for receiving millimeter and sub-millimeter wavelength imaging comprising: an antenna configured for receiving millimeter and sub-millimeter wavelengths; a regenerative oscillator, as a first oscillator, configured for oscillating at a first frequency in response to receiving a signal from said antenna; an envelope detector coupled to an output of said regenerative oscillator, said envelope detector configured for generating a digital envelope threshold output in response to detecting that the oscillation envelope has reached a threshold; an auxiliary oscillator, configured for oscillating at a second frequency, which is coupled to said regenerative oscillator to create inter-modulation between oscillating frequencies of said regenerative oscillator and said auxiliary oscillator within said regenerator oscillator as additional receive bands allowing said apparatus to perform simultaneous imaging operation at multiple frequencies; and a digital quench circuit coupled to said regenerative oscillator for activating and deactivating said regenerative oscillator in response to receiving said digital envelope threshold output, and for generating a time encoded digital signal in response to pixel amplitude during millimeter and sub-millimeter wavelength imaging.

19. The apparatus as recited in embodiment 18, wherein imaging is provided at fundamental and inter-modulation frequencies wherein both transmissive and reflective imaging can be performed.

20. The apparatus as recited in embodiment 18, wherein a no gain amplifier stage couples said antenna to said regenerative oscillator to reduce loading of said regenerative oscillator by said antenna which has a low impedance.

21. A digital regenerative receiver apparatus, comprising: a regenerative oscillator configured for oscillating at a first frequency in response to receiving a signal from an antenna; an envelope detector coupled to an output of said regenerative oscillator, said envelope detector configured for generating a digital envelope threshold output in response to detecting that an oscillation envelope from the oscillator has reached a threshold; and a digital quench circuit coupled to said regenerative oscillator for activating and deactivating said regenerative oscillator in response to receiving said digital envelope threshold output.

22. The apparatus as recited in embodiment 21, further comprising an antenna coupled to said regenerative oscillator and configured for receiving millimeter and sub-millimeter wavelengths.

23. The apparatus as recited in embodiment 21, wherein said digital quench circuit generates a time encoded digital signal in response to pixel amplitude during millimeter and sub-millimeter wavelength imaging.

24. A digital regenerative receiver apparatus, comprising: an oscillator circuit configured for oscillating in response to receiving an a signal in the millimeter or sub-millimeter wavelength; an envelope detector circuit coupled to the oscillator circuit; and a digital latch circuit coupled to the oscillator circuit and the envelope detector circuit; wherein the digital latch circuit is set and the oscillator circuit is engaged in response to arrival of a clock edge; wherein oscillation is terminated when output from the oscillator circuit triggers an envelope detector to reset the digital latch circuit.

25. The apparatus as recited in embodiment 24, wherein the digital regenerative receiver requires only two bias currents.

26. The apparatus as recited in embodiment 24, wherein the digital regenerative receiver requires only two passive inductors.

27. An apparatus for receiving millimeter and sub-millimeter wavelength imaging signals, said apparatus comprising: a regenerative oscillator circuit configured for oscillating at a first frequency in response to receiving a signal; an envelope detector circuit coupled to an output of the regenerative oscillator circuit, said envelope detector circuit configured for generating an envelope threshold output in response to detecting that an oscillation envelope has reached a threshold; and a quench circuit coupled to said regenerative oscillator circuit, said quench circuit configured for activating and deactivating said regenerative oscillator in response to receiving said envelope threshold output; wherein said oscillator circuit is configured to receive said signal without a separate antenna.

Another embodiment of the invention is a device for millimeter and sub-millimeter wavelength imaging.

Another embodiment of the invention is an EHF imaging receiver which generates a digital output in response to pixel amplitude without the need of an analog-to-digital (AD) converter.

Another embodiment of the invention is a device for millimeter and sub-millimeter wavelength imaging which can be utilized for both transmissive and reflective imaging.

Another embodiment of the invention is a device for millimeter and sub-millimeter wavelength imaging which can be configured for simultaneous operation at multiple frequencies.

Another embodiment of the invention is a device for millimeter and sub-millimeter wavelength imaging which is particularly well-suited for use within an imaging array.

Another embodiment of the invention is a device for millimeter and sub-millimeter wavelength imaging which operates at low power consumption levels and has a small device footprint.

Another embodiment of the invention is a device for millimeter and sub-millimeter wavelength imaging in which pixel image signals comprise digital signals which can be readily routed through and from an array.

Another embodiment of the invention is a device for millimeter and sub-millimeter wavelength imaging which utilizes a digital quenching mechanism that operates in combination with the regenerative nature of the device to automatically generate a time encoded digital signal.

Another embodiment of the invention is a device for millimeter and sub-millimeter wavelength imaging which requires only two bias currents.

Another embodiment of the invention is a device for millimeter and sub-millimeter wavelength imaging which requires only two inductors.

Another embodiment of the invention is a device for millimeter and sub-millimeter wavelength imaging having a digital latch operating as a digital quench circuit triggered in response to envelope detection.

Another embodiment of the invention is a device for millimeter and sub-millimeter wavelength imaging comprising an auxiliary oscillator coupled to a regenerative oscillator having a digital quench circuit driven in response to oscillator threshold detection.

Another embodiment of the invention is a device for millimeter and sub-millimeter wavelength imaging which provides imaging at fundamental and inter-modulation frequencies.

A still further element of the invention is a device for millimeter and sub-millimeter wavelength imaging in which receiver operation is possible at frequencies above where device gain is available.

Although the description above contains many details, these should not be construed as limiting the scope of the invention but as merely providing illustrations of some of the presently preferred embodiments of this invention.

Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

DRR Performance Summary

| Receiver Characteristics | Value | |
|---|---|---|
| Frequency | 183 | GHz |
| Power Dissipation | 13.5 | mW/pixel |
| Peak Responsivity (time encoded output) | 1.3 | ms/W |
| Die area | $1.31 \times 10^4$ | $\mu m^2$/pixel |
| Sensitivity | −72.5 | dBm |
| Saturated Output | 1.2 | ns |
| Measured Maximum sample rate | 750 | MS/s |
| 3 dB time-bandwidth | 1.4 | GHz |
| Noise Figure (NF) | 9.9 | dB (determined from sensitivity - KTB) |

TABLE 1-continued

DRR Performance Summary

| Receiver Characteristics | Value | |
|---|---|---|
| Noise Equivalent Power (NEP) | 1.51 | $fW/Hz^{0.5}$ (determined from $KT[NF] B^{0.5}$) |

TABLE 2

DRR Performance Comparison

| Receiver Characteristics | 1: MWCL 2008 | 2: RFIC 2010 | 3: CICC 2007 | DRR |
|---|---|---|---|---|
| Power Dissipation | 250 | 200 | 93 | 13.5 |
| Area ($\mu m^2$) | Discrete | $1.25 \times 10^6$ | $3.02 \times 10^5$ | $1.31 \times 10^4$ |
| Output Format | Analog | Analog | Analog | Digital (Time-) |
| Frequency | 580 GHz | 94 GHz | 94 GHz | 180 GHz |
| Technology | GaAs | 180 nm SiGe | 65 nm CMOS | 65 nm CMOS |

TABLE 3

IRR Performance Summary

| IRR Receiver Characteristics | Value | |
|---|---|---|
| Simultaneous Receiving Frequency Bands | 53, 201, and 349 | GHz |
| Power Dissipation | 18.2 | mW/pixel |
| Pixel Die Area | 0.45 | $mm^2$ (0.021 without antenna) |
| 349 GHz Band Peak Responsivity | 187 | MV/W |
| 201 GHz Band Peak Responsivity | 2650 | MV/W |
| 53 GHz Band Peak Responsivity | 103 | MV/W |
| 349 GHz Noise Equivalent Power (NEP) | 405 | $fW/Hz^{0.5}$ |
| 201 GHz Noise Equivalent Power (NEP) | 28 | $fW/Hz^{0.5}$ |
| 53 GHz Noise Equivalent Power (NEP) | 665 | $fW/Hz^{0.5}$ |

TABLE 4

IRR Performance Comparison

| RX Type | 1: JSSC 2009 | 2: RFIC 2010 | 3: CICC 2007 | 4: ISSCC 2011 | IRR |
|---|---|---|---|---|---|
| Image Color(s) | Black/White | Black/White | Black/White | Black/White | Black/white and/or Multiple Colors |
| Receiving mode(s) | Transmission | Passive | Transmission | Transmission | (a) Transmission (b) Simult. 3 bands & (c) Reflective |
| Power Dissipation (mW/pixel) | 5.5 | 200 | 93 | 13.5 | 18.2 |
| Area ($mm^2$) | 0.03 | 1.25 | 0.31 | 0.013 | 0.021 |
| NEP ($fW/Hz^{0.5}$) | 300000 | 10.3 | 200 | 1.51 | 405/28/665 |
| Freq. (GHz) | 600 | 94 | 94 | 183 | 349/201/53 |
| Technology | 0.25 μm CMOS | 180 nm SiGe | 65 nm CMOS | 65 nm CMOS | 65 nm CMOS |

What is claimed is:

1. An apparatus for receiving millimeter and sub-millimeter wavelength imaging signals, said apparatus comprising:
   an antenna configured for receiving millimeter and sub-millimeter wavelengths;
   a regenerative oscillator circuit configured for oscillating at a first frequency in response to receiving a signal from said antenna;
   an envelope detector circuit coupled to an output of the regenerative oscillator circuit, said envelope detector circuit configured for generating a digital envelope threshold output in response to detecting that an oscillation envelope has reached a threshold; and
   a digital quench circuit coupled to said regenerative oscillator circuit, said digital quench circuit configured for activating and deactivating said regenerative oscillator in response to receiving said digital envelope threshold output, and for generating a time encoded digital signal in response to pixel amplitude during millimeter and sub-millimeter wavelength imaging.

2. The apparatus as recited in claim 1, wherein oscillator startup time in said regenerative oscillator circuit is inversely proportional to injected power of said pixel amplitude.

3. The apparatus as recited in claim 1, wherein said apparatus generates a digital output in response to said pixel amplitude without the need for an analog-to-digital converter.

4. The apparatus as recited in claim 1, wherein said apparatus is integrated within an imaging array in which said time encoded digital signal from each element of said imaging array is routed through said imaging array.

5. The apparatus as recited in claim 1, wherein said digital quench circuit comprises a latch circuit which is configured for being set in response to receipt of a clock signal and reset in response to receipt of an output from said envelope detector circuit.

6. The apparatus as recited in claim 1, further comprising a low-noise amplifier stage coupled between said antenna and said regenerative oscillator circuit, wherein said low-noise amplifier stage shares a load inductor with said regenerative oscillator circuit.

7. The apparatus as recited in claim 1, further comprising a slew limiting circuit between said digital quench circuit and said regenerative oscillator circuit for limiting slew rate of the output from said digital quench circuit and for reducing broadband switching noise.

8. The apparatus as recited in claim 1, further comprising at least one auxiliary oscillator circuit configured for oscillating at a second frequency, said auxiliary oscillator circuit coupled to said regenerative oscillator circuit to create inter-modulation between oscillating frequencies of said regenerative oscillator circuit and said auxiliary oscillator circuit to perform simultaneous imaging at multiple frequencies.

9. The apparatus as recited in claim 8, wherein said auxiliary oscillator circuit is configured to oscillate continuously during operation.

10. The apparatus as recited in claim 8, wherein said imaging is provided at fundamental and inter-modulation frequencies.

11. The apparatus as recited in claim 8, further comprising a no gain amplifier stage coupling said antenna to said regenerative oscillator circuit for reducing loading of said regenerative oscillator circuit by said antenna.

12. An apparatus for receiving millimeter and sub-millimeter wavelength imaging, comprising:
   an antenna configured for receiving millimeter and sub-millimeter wavelengths;
   a regenerative oscillator circuit configured for oscillating at a first frequency in response to receiving a signal from said antenna, wherein oscillator startup time is inversely proportional to injected power from said antenna;
   an envelope detector circuit coupled to an output of said regenerative oscillator circuit, said envelope detector circuit configured for generating a digital envelope threshold output in response to detecting that an oscillation envelope has reached a threshold; and
   a digital latch circuit coupled to said regenerative oscillator circuit for activating and deactivating said regenerative oscillator circuit in response to receiving said digital envelope threshold output, and for generating a time encoded digital signal in response to pixel amplitude during millimeter and sub-millimeter wavelength imaging;
   wherein said time encoded digital signal is generated from said digital latch circuit in response to said pixel amplitude without the need of an analog-to-digital converter.

13. The apparatus as recited in claim 12, wherein said apparatus is integrated within an imaging array in which said time encoded digital signal from each element of said imaging array is routed through said imaging array.

14. The apparatus as recited in claim 12, wherein said digital latch circuit is configured for being set in response to receipt of a clock signal and reset in response to receipt of an output from said envelope detector circuit.

15. The apparatus as recited in claim 12, further comprising a low-noise amplifier stage coupled between said antenna and said regenerative oscillator circuit, said low-noise amplifier stage sharing a load inductor with said regenerative oscillator circuit.

16. The apparatus as recited in claim 12, further comprising a slew limiting circuit between said digital latch circuit and said regenerative oscillator circuit for limiting slew rate of the output from said digital latch circuit for reducing broadband switching noise.

17. The apparatus as recited in claim 12, further comprising at least one auxiliary oscillator circuit configured for oscillating at a second frequency, said auxiliary oscillator circuit coupled to said regenerative oscillator circuit to create inter-modulation between oscillating frequencies of said regenerative oscillator circuit and said auxiliary oscillator circuit to perform simultaneous imaging at multiple frequencies.

18. An apparatus for receiving millimeter and sub-millimeter wavelength imaging comprising:
   an antenna configured for receiving millimeter and sub-millimeter wavelengths;
   a regenerative oscillator circuit configured for oscillating at a first frequency in response to receiving a signal from said antenna;
   an envelope detector circuit coupled to an output of said regenerative oscillator circuit, said envelope detector circuit configured for generating a digital envelope threshold output in response to detecting that the oscillation envelope has reached a threshold;
   an auxiliary oscillator circuit configured for oscillating at a second frequency, said auxiliary oscillator circuit coupled to said regenerative oscillator circuit to create inter-modulation between oscillating frequencies of said regenerative oscillator circuit and said auxiliary oscillator circuit to perform simultaneous imaging at multiple frequencies; and
   a digital quench circuit coupled to said regenerative oscillator circuit for activating and deactivating said regenerative oscillator circuit in response to receiving said digital envelope threshold output, and for generating a time encoded digital signal in response to pixel amplitude during millimeter and sub-millimeter wavelength imaging.

19. The apparatus as recited in claim 18, wherein said imaging is provided at fundamental and inter-modulation frequencies, wherein both transmissive and reflective imaging can be performed.

20. The apparatus as recited in claim 18, further comprising a no gain amplifier stage coupling said antenna to said regenerative oscillator circuit to reduce loading of said regenerative oscillator circuit by low impedance of said antenna.

21. A digital regenerative receiver apparatus, comprising:
   a regenerative oscillator circuit configured for oscillating at a first frequency in response to receiving a signal from an antenna;
   an envelope detector circuit coupled to an output of said regenerative oscillator circuit, said envelope detector circuit configured for generating a digital envelope threshold output in response to detecting that an oscillation envelope from the oscillator has reached a threshold; and
   a digital quench circuit coupled to said regenerative oscillator circuit for activating and deactivating said regenerative oscillator circuit in response to receiving said digital envelope threshold output;

wherein said digital quench circuit generates a time encoded digital signal in response to a pixel amplitude during millimeter and sub-millimeter wavelength imaging.

22. The digital regenerative receiver apparatus of claim 21, further comprising an antenna coupled to said regenerative oscillator circuit, said antenna configured for receiving millimeter and sub-millimeter wavelengths.

23. A digital regenerative receiver apparatus, comprising:
an oscillator circuit configured for oscillating in response to receiving a signal in the millimeter or sub-millimeter wavelength;
an envelope detector circuit coupled to the oscillator circuit; and
a digital latch circuit coupled to the oscillator circuit and the envelope detector circuit;
wherein the digital latch circuit is set and the oscillator circuit is activated in response to arrival of a clock edge; and
wherein oscillation is terminated when output from the oscillator circuit triggers an envelope detector to reset the digital latch circuit.

24. The apparatus as recited in claim 23, wherein the digital regenerative receiver requires only two bias currents.

25. The apparatus as recited in claim 23, wherein the digital regenerative receiver requires only two passive inductors.

* * * * *